(12) United States Patent
Endo et al.

(10) Patent No.: US 11,645,607 B2
(45) Date of Patent: *May 9, 2023

(54) DELIVERY ASSISTANCE DEVICE, DELIVERY ASSISTANCE METHOD, AND NON-TRANSITORY COMPUTER-READABLE COMPUTER MEDIUM STORING DELIVERY ASSISTANCE PROGRAM

(71) Applicant: TOYOTA JIDOSHA KABUSHIKI KAISHA, Toyota (JP)

(72) Inventors: Masato Endo, Nagakute (JP); Yuichiro Haruna, Oyama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/809,129

(22) Filed: Jun. 27, 2022

(65) Prior Publication Data

US 2022/0327474 A1    Oct. 13, 2022

Related U.S. Application Data

(63) Continuation of application No. 16/166,679, filed on Oct. 22, 2018, now Pat. No. 11,403,586.

(30) Foreign Application Priority Data

Nov. 6, 2017   (JP) .............................. JP2017-214243

(51) Int. Cl.
*G06Q 10/08*       (2023.01)
*G06Q 10/0832*    (2023.01)
(Continued)

(52) U.S. Cl.
CPC ....... *G06Q 10/0832* (2013.01); *G06Q 10/083* (2013.01); *G06Q 10/0835* (2013.01);
(Continued)

(58) Field of Classification Search
CPC . G06Q 10/0832; G06Q 10/0835; G06Q 50/30
See application file for complete search history.

(56) References Cited

U.S. PATENT DOCUMENTS 9,508,204 B2   11/2016  Oz et al.
9,934,530 B1 *  4/2018  Iacono ............... G06Q 30/0639
(Continued)

FOREIGN PATENT DOCUMENTS

CN       107111948 A      8/2017
DE   10 2015 205 300 A1   9/2016
(Continued)

OTHER PUBLICATIONS

Minch, Robert P. "Privacy issues in location-aware mobile devices." 37th Annual Hawaii International Conference on System Sciences, 2004. Proceedings of the IEEE, 2004. (Year: 2004).*

(Continued)

*Primary Examiner* — Scott M Tungate
(74) *Attorney, Agent, or Firm* — Oblon, McClelland, Maier & Neustadt, L.L.P.

(57) ABSTRACT

A delivery assistance device assists in an operation of a delivery service in which the inside of a vehicle, a building, or a facility that is used by a purchaser is designated as a delivery destination of one or more products purchased via a predetermined website regarding electronic commerce. The delivery assistance device includes a controller configured to transmit delivery destination information on the vehicle, the building, or the facility for designating the inside of the vehicle, the building, or the facility that is used by the user as a delivery destination of the product to an external device or a terminal at which the user browses the website when the controller receives user information indi- (Continued)

cating that the user intends to order the one or more products in the website from the external device operating the website.

17 Claims, 9 Drawing Sheets

(51) Int. Cl.
*G07F 17/12* (2006.01)
*G06Q 50/28* (2012.01)
*G06Q 10/083* (2023.01)
*G07C 9/00* (2020.01)
*G06Q 30/0601* (2023.01)
*G06Q 10/0835* (2023.01)
*G06Q 50/30* (2012.01)

(52) U.S. Cl.
CPC ..... *G06Q 30/0601* (2013.01); *G06Q 30/0641* (2013.01); *G06Q 50/28* (2013.01); *G06Q 50/30* (2013.01); *G07C 9/00571* (2013.01); *G07C 9/00896* (2013.01); *G07F 17/12* (2013.01)

(56) References Cited

U.S. PATENT DOCUMENTS

| | | | | |
|---|---|---|---|---|
| 2009/0240597 | A1* | 9/2009 | Oswald | G06Q 20/4016 705/26.1 |
| 2014/0278099 | A1* | 9/2014 | Schenken | G06Q 10/083 701/533 |
| 2014/0351163 | A1 | 11/2014 | Tussy | |
| 2015/0215779 | A1 | 7/2015 | Fokkelman et al. | |
| 2015/0310532 | A1 | 10/2015 | Gura et al. | |
| 2015/0332531 | A1 | 11/2015 | Davidsson et al. | |
| 2016/0098670 | A1* | 4/2016 | Oz | H04W 4/40 705/27.1 |
| 2016/0189098 | A1* | 6/2016 | Beaurepaire | H04W 12/084 705/337 |
| 2017/0017920 | A1 | 1/2017 | Stark et al. | |

FOREIGN PATENT DOCUMENTS

| | | |
|---|---|---|
| EP | 3 151 188 A1 | 4/2017 |
| JP | 2002-288562 A | 10/2002 |
| JP | 2003-160231 A | 6/2003 |
| JP | 2006-206225 | 8/2006 |
| JP | 2013-105334 A | 5/2013 |
| JP | 2015-45141 | 3/2015 |
| KR | 10-2002-0001483 A | 1/2002 |
| WO | WO 2005/029374 A1 | 3/2005 |
| WO | WO 2016/054200 A1 | 4/2016 |

OTHER PUBLICATIONS

Office Action dated Jun. 24, 2020 in corresponding European Patent Application No. 18 201 834.1, 10 pages.

* cited by examiner

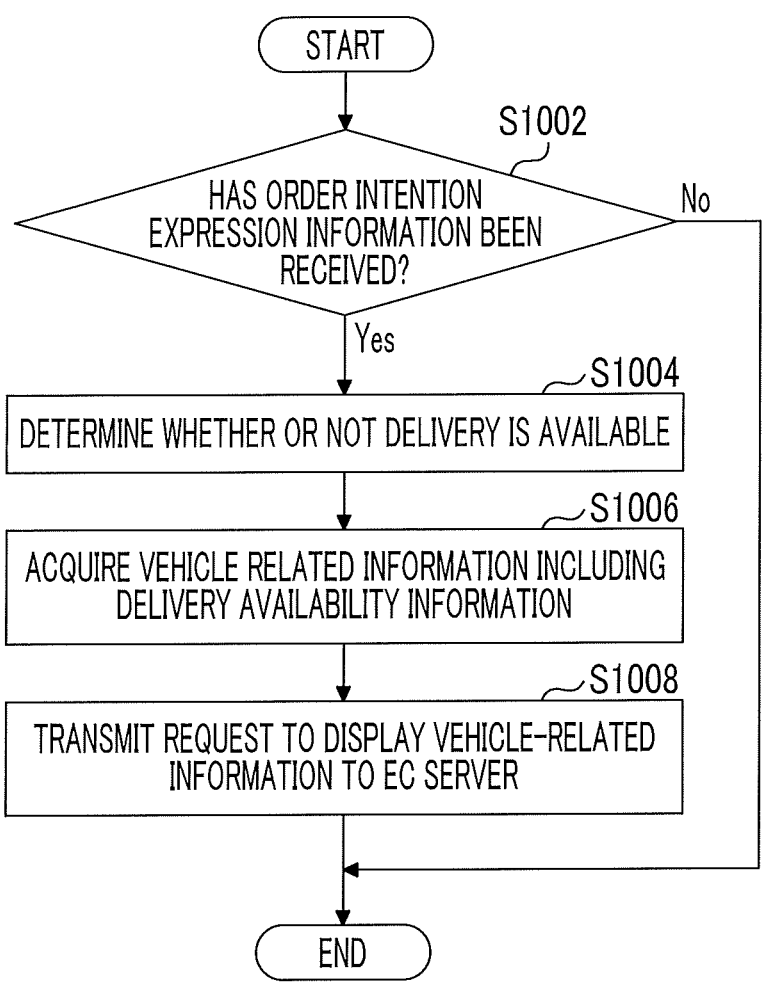

DELIVERY ASSISTANCE DEVICE, DELIVERY ASSISTANCE METHOD, AND NON-TRANSITORY COMPUTER-READABLE COMPUTER MEDIUM STORING DELIVERY ASSISTANCE PROGRAM

INCORPORATION BY REFERENCE

This application is a continuation of U.S. application Ser. No. 16/166,679, filed Oct. 22, 2018, which claims the benefit of priority of Japanese Patent Application No. 2017-214243 filed on Nov. 6, 2017, the contents of each of which are incorporated herein by reference in their entirety.

BACKGROUND

1. Technical Field

The present disclosure relates to a delivery assistance device, a delivery assistance method, and a non-transitory computer-readable computer medium storing a delivery assistance program.

2. Description of Related Art

For example, a mechanism for using a vehicle cabin of a vehicle such as a trunk as a delivery destination of a luggage is disclosed (see Japanese Unexamined Patent Application Publication No. 2006-206225 (JP 2006-206225 A) or the like).

Specifically, when a predetermined transmission signal is transmitted from a terminal carried by a deliverer to a vehicle and accordingly, authentication based on authentication information (key information) included in the transmission signal is successful on the vehicle side, a trunk of the vehicle is unlocked and a deliverer can accommodates luggage in the trunk. Accordingly, a delivery company can provide a customer with a delivery service in which the trunk of the vehicle can be designated as a delivery destination (hereinafter referred to as a "trunk delivery service"). Similarly, for example, the delivery company can also provide a delivery service in which the inside of a lockable and unlockable building or facility used by a user, such as a house or a villa, can be designated as a delivery destination.

SUMMARY

However, in the case of a delivery service in which a product that a user purchases at an electronic commerce (EC) site is delivered to the inside of a vehicle, a building, or a facility (hereinafter referred to as a "vehicle or the like" for convenience) that is used by the user, information on the vehicle or the like of the user is likely to be needed in order to set a delivery destination of the product. For example, position information on a parking position of the vehicle or a position of the building or the facility is likely to be needed in order to determine whether or not the parking position of the vehicle or the position of the building or the facility is within a deliverable area. Information on a use schedule of the vehicle or the like may be needed in order to confirm a date and time that cannot be used as a designated delivery time period due to use by another user who uses the vehicle or the like, use on another service, or the like. For example, in order to determine whether or not the trunk of the vehicle is physically in a state in which a product can be delivered to the trunk of the vehicle, for example, information on a situation of delivery to the trunk of the vehicle of the user such as whether or not there is a luggage to be delivered on the day or whether or not there is a luggage that has already been delivered and not received is likely to be needed. Therefore, for example, when a configuration in which a server or the like corresponding to an EC site can acquire all pieces of information on the vehicle or the like of the user who uses the EC site at any timing is adopted, there is a concern in terms of the privacy of the user who uses the vehicle or the like.

The present disclosure provides a delivery assistance device, a delivery assistance method, and a non-transitory computer-readable computer medium storing a delivery assistance program capable of establishing a mechanism for causing a user to designate the inside of a vehicle or the like as a delivery destination of a product while considering the privacy of a user in a delivery service in which the inside of a vehicle or the like used by a purchaser can be designated as a delivery destination of a product purchased via an EC site.

A first aspect of the present disclosure relates to a delivery assistance device that assists in an operation of a delivery service in which an inside of a vehicle, a building, or a facility that is used by a purchaser is designated as a delivery destination of one or more products purchased via a predetermined website regarding electronic commerce. The delivery assistance device comprises a controller configured to transmit delivery destination information to an external device or a terminal at which a user browses the website, when the controller receives user information indicating that the user intends to order the one or more products in the website from the external device operating the website. The delivery destination information relates to the vehicle, the building, or the facility for the user to designate the inside of the vehicle, the building, or the facility that is used by the user as a delivery destination of the one or more products.

According to the first aspect of the present disclosure, the delivery assistance device can limit information on the vehicle or the like of the user transmitted to the external device to the delivery destination information on the vehicle or the like for designating the inside of the vehicle or the like of the user as the delivery destination of the product. The delivery assistance device can transmit the delivery destination information on the vehicle or the like to the EC site or the like solely when the user intends to order the product. Therefore, a situation in which all pieces of information on the vehicle or the like used by the user are provided to the external device operating the EC site or the like at any timing is suppressed. Therefore, it is possible to establish a mechanism for causing the inside of the vehicle or the like to be designated as the delivery destination of the product while taking the privacy of the user into consideration.

In the delivery assistance device according to the first aspect of the present disclosure, the controller may cause the delivery destination information on the vehicle, the building, or the facility to be displayed on a predetermined web page of the website browsed by the user when the controller receives the user information indicating that the user intends to order the one or more products in the website from the external device.

According to the first aspect of the present disclosure, the delivery assistance device can control the delivery destination information on the vehicle or the like used by the user, which is displayed on the EC site.

In the delivery assistance device according to the first aspect of the present disclosure, the controller may cause the delivery destination information on the vehicle, the building, or the facility to be displayed on the web page without passing through the external device.

According to the first aspect of the present disclosure, the delivery assistance device does not need to transmit the delivery destination information on the vehicle or the like to the external device operating the EC site in order to cause the delivery destination information on the vehicle or the like to be displayed on a web page of the EC site. Therefore, it is possible to establish a mechanism taking the privacy of the user into consideration.

In the delivery assistance device according to the first aspect of the present disclosure, the controller may cause the delivery destination information on the vehicle, the building, or the facility to be displayed on the web page via a predetermined application programming interface (API) embedded in the web page, the web page being used for designating or inputting information needed for the user to order the one or more products.

According to the first aspect of the present disclosure, when shift to the web page in which, for example, the information needed for ordering the product at the EC site is designated occurs, that is, when the user expresses intention to order the product, the delivery assistance device can cause the delivery destination information on the vehicle or the like to be displayed on the web page through the API embedded in the web page. Therefore, the delivery assistance device can specifically cause the information on the vehicle or the like to be displayed on the web page without transmitting the delivery destination information on the vehicle or the like to the external device operating the EC site.

In the delivery assistance device according to the first aspect of the present disclosure, the controller may cause a warning indicating that delivery of the one or more products to a trunk of the vehicle is likely not to be available to be displayed on the web page or prevents the user from selecting the trunk of the vehicle as the delivery destination of the one or more product, when the number of the products to be delivered to the trunk of the vehicle based on a user's request exceeds a predetermined number or a total volume of the one or more products to be delivered to the trunk of the vehicle based on the user's request exceeds a predetermined capacity.

According to the first aspect of the present disclosure, the delivery assistance device can prompt the user not to select the trunk of the vehicle as the delivery destination by issuing a warning to the user when the user tries to cause a large amount of luggage including a product to be ordered to be delivered to the trunk of the vehicle. The delivery assistance device can forcibly prevent the user from selecting the trunk of the vehicle as the delivery destination of the product when the user tries to cause a large amount of luggage including a product to be ordered to be delivered to the trunk of the vehicle.

The delivery assistance device according to the first aspect of the present disclosure may further include a delivery availability determination unit configured to determine whether or not the delivery of the one or more products to a trunk of the vehicle is available, and the delivery destination information on the vehicle, the building, or the facility includes a determination result of the delivery availability determination unit.

According to the first aspect of the present disclosure, the delivery assistance device can determine whether or not the delivery is available and display a result of the determination on the web page of the EC site in advance. Therefore, the delivery assistance device, for example, can avoid the occurrence of a situation in which the product cannot be delivered as a result for reasons such as the trunk being full or the vehicle being outside a deliverable area despite the trunk of the vehicle having been designated as the delivery destination of the product by the user.

In the delivery assistance device according to the first aspect of the present disclosure, the controller may allow the user to designate the trunk of the vehicle as the delivery destination of the one or more products in the web page solely when the delivery availability determination unit determines that the delivery of the one or more products to the trunk of the vehicle is available.

According to the first aspect of the present disclosure, when the delivery assistance device determines that the product cannot be delivered to the trunk of the vehicle, the delivery assistance device can prevent the trunk of the vehicle from being designated as the delivery destination of the product.

In the delivery assistance device according to the first aspect of the present disclosure, when the delivery availability determination unit determines that the delivery of the one or more products to the trunk of the vehicle is not available, the controller causes a display to be performed so that the user is prevented from selecting an option of the trunk of the vehicle as the delivery destination of the one or more products or causes an indication that the one or more products is not able to be delivered to the trunk of the vehicle to be displayed on the web page.

According to the first aspect of the present disclosure, the delivery assistance device can recognize a situation in which the delivery of the product to the trunk of the vehicle is not available for some reason on the premise that the trunk of the vehicle serving as an option of the delivery destination of the product is prepared for the user.

The delivery assistance device according to the first aspect of the present disclosure may further include a loading situation specifying unit configured to specify a loading situation of the trunk of the vehicle, and the delivery availability determination unit determines that the delivery of the one or more products to the trunk of the vehicle as the delivery destination of the one or more products is not available when the loading situation specified by the loading situation specifying unit exceeds a predetermined reference.

According to the first aspect of the present disclosure, the delivery assistance device can prevent the trunk of the vehicle from being designated as the delivery destination of the product in a situation in which the loading situation of the trunk of the vehicle is a situation in which a predetermined reference is exceeded and the trunk is substantially full.

In the delivery assistance device according to the first aspect of the present disclosure, the loading situation specifying unit may specify the loading situation of the trunk of the vehicle based on at least one of a total volume or the number of the one or more products which have been delivered to the trunk of the vehicle and a total volume or the number of the one or more products which the trunk of the vehicle has received.

According to the first aspect of the present disclosure, the delivery assistance device can finally recognize, for example, how much the delivered luggage is present after a date and time at which the luggage of the trunk has been received, from the situation of the delivery of the luggage to the trunk and the situation of reception of the luggage from the trunk. Therefore, the delivery assistance device can specifically specify the loading situation of the trunk of the vehicle.

The delivery assistance device according to the first aspect of the present disclosure may further include an image acquisition unit configured to acquire an image of an inside of the trunk at a time of delivery completion. The image is captured with a camera of a mobile terminal by a deliverer who has delivered the one or more products to the trunk of the vehicle. The loading situation specifying unit may specify the loading situation of the trunk of the vehicle based on the image acquired by the image acquisition unit.

According to the first aspect of the present disclosure, the delivery assistance device can specifically specify the loading situation of the trunk of the vehicle from the captured image captured by the camera of the mobile terminal carried, at the time of delivery completion, by the deliverer who has delivered the luggage to the vehicle at the latest.

In the delivery assistance device according to the first aspect of the present disclosure, the delivery availability determination unit may determine whether or not the delivery of the one or more products to the trunk of the vehicle is available based on a type of each of the one or more products.

According to the first aspect of the present disclosure, for example, when the product is food, the delivery assistance device supposes a situation in which the trunk of the vehicle becomes at a high temperature under hot weather in the summer or falls below a freezing point in the winter, and therefore, the delivery assistance device can determine, for example, that the delivery to the trunk of the vehicle is not available. In the case of a long product having a certain length such as a ski or a surfboard, for example, the delivery assistance device determines that the delivery to the trunk of the vehicle is not available since the long product cannot fit in the trunk of the vehicle. Therefore, the delivery assistance device can specifically determine whether or not the delivery of the product to the trunk of the vehicle is available.

In the delivery assistance device according to the first aspect of the present disclosure, when the one or more products include a product needing refrigeration or a product needing freezing, the delivery availability determination unit determines whether or not the delivery of the one or more products to the trunk of the vehicle is available based on whether or not a cold storage facility or a cold storage product is present in the trunk of the vehicle.

According to the first aspect of the present disclosure, the delivery assistance device can specifically determine whether or not the delivery of the product to the trunk of the vehicle is available based on the type of the product.

In the delivery assistance device according to the first aspect of the present disclosure, the delivery availability determination unit may determine whether or not the delivery of the one or more products to the trunk of the vehicle is available based on a parking position of the vehicle.

According to the first aspect of the present disclosure, the delivery assistance device can determine whether or not the delivery is available, for example, according to whether the parking position of the vehicle is within the deliverable area or outside the deliverable area. Therefore, the delivery assistance device can specifically determine whether or not the product can be delivered to the trunk of the vehicle.

In the delivery assistance device according to the first aspect of the present disclosure, the delivery availability determination unit may determine whether or not the delivery of the one or more products to the trunk of the vehicle is available based on information on a vehicle type of the vehicle.

According to the first aspect of the present disclosure, since a size or shape of the trunk of the vehicle may differ according to the vehicle type of the vehicle, the delivery assistance device can determine whether or not the delivery of the product to the trunk of the vehicle is available in consideration of the difference for each vehicle type. Therefore, the delivery assistance device can specifically determine whether or not the delivery of the product to the trunk of the vehicle is available.

A second aspect of the present disclosure relates to a delivery assistance method that is executed by a delivery assistance device that assists in an operation of a delivery service in which an inside of a vehicle, a building, or a facility that is used by a purchaser is designated as a delivery destination of one or more products purchased via a predetermined website regarding electronic commerce. The delivery assistance method comprises transmitting delivery destination information to an external device or a terminal at which a user browses the website when information indicating that the user intends to order the one or more products in the website is received from the external device operating the website. The delivery destination information is relating to the vehicle, the building, or the facility for the user to designate the inside of the vehicle, the building, or the facility that is used by the user as a delivery destination of the one or more products.

A third aspect of the present disclosure relates to a non-transitory computer-readable computer medium storing a delivery assistance program. The delivery assistance program causes an information processing device to execute transmitting of delivery destination information to an external device or a terminal at which a user browses a website, when information indicating that the user intends to order the one or more products in the web site is received from the external device operating a predetermined website regarding electronic commerce. The delivery destination information is related to a vehicle, a building, or a facility for the user to designate an inside of the vehicle, the building, or the facility that is used by a user as a delivery destination of one or more products.

According to the above-described aspects, it is possible to provide a delivery assistance device, a delivery assistance method, and a non-transitory computer-readable computer medium storing a delivery assistance program capable of establishing a mechanism for causing a user to designate the inside of a vehicle or the like as a delivery destination of a product while considering the privacy of a user in a delivery service in which the inside of a vehicle or the like used by a purchaser can be designated as a delivery destination of a purchased product at an EC site.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 10 is a flowchart illustrating a fourth example of the vehicle-related information providing process in the center server.

DETAILED DESCRIPTION OF EMBODIMENTS

Hereinafter, embodiments will be described with reference to the drawings.

Overall Configuration of Key Information Management System

Figure 1:
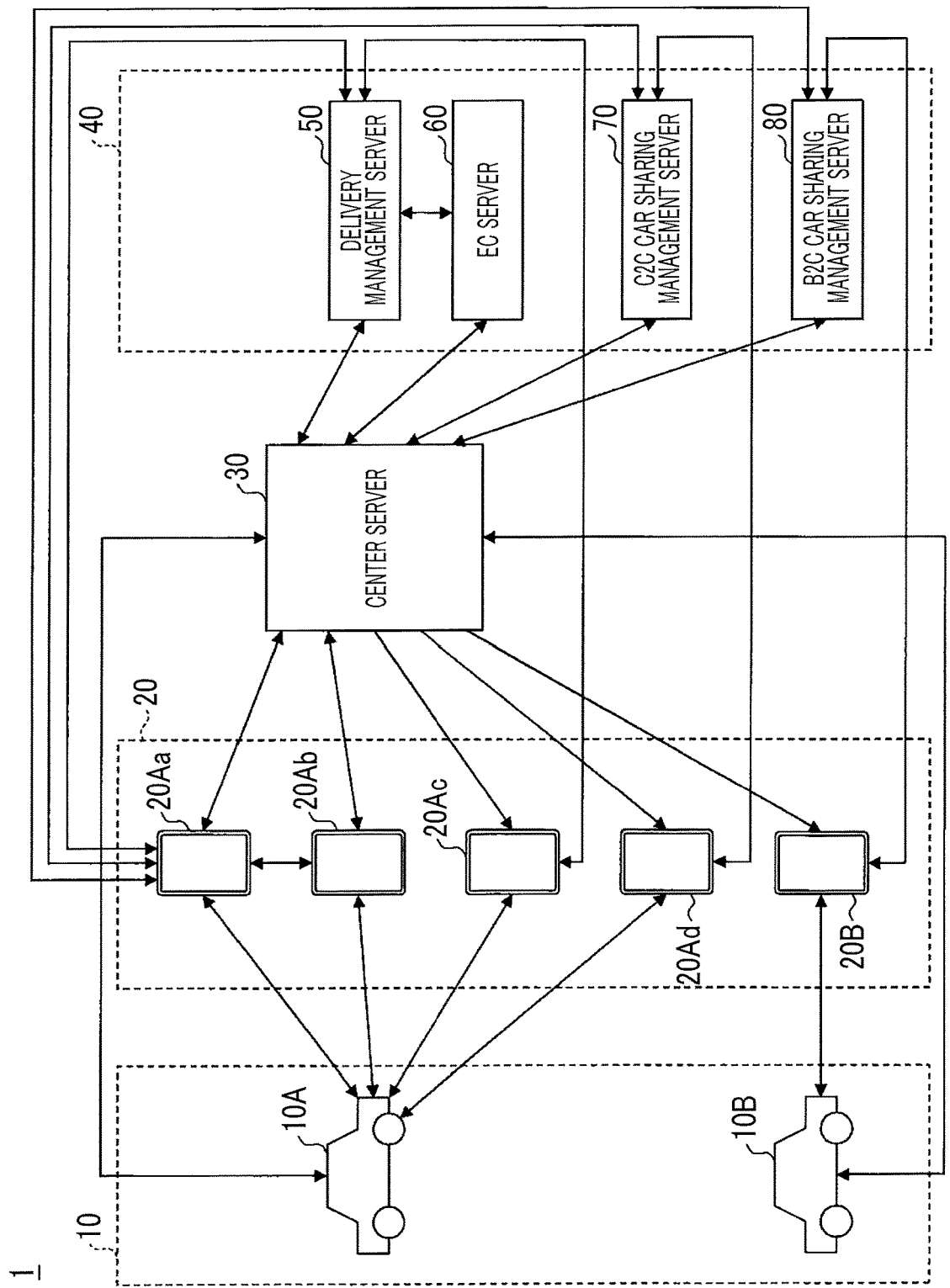
FIG. 1 is a diagram illustrating an example of an overall configuration of an authentication key management system.

FIG. 1 is a block diagram illustrating an example of an overall configuration of a key information management system according to the embodiment.

An authentication key management system 1 includes a vehicle 10, a mobile terminal 20, a center server 30, and a service management server 40.

The vehicle 10 can perform wireless communication (hereinafter referred to as "near field communication") with the mobile terminal 20 at a relatively short distance (a distance that allows communication between the inside of a vehicle cabin and the outside of the vehicle cabin) according to a predetermined communication standard. The vehicle 10 is a target on which locking and unlocking of doors and activation (ignition on) of the vehicle 10 are performed based on transmission signals (an authentication request, a locking request, and an unlocking request to be described below) from the mobile terminal 20. The door of the vehicle 10 may include not only a door for getting on and off, but also a door for a luggage (for example, a trunk lid or a back door) for accessing a trunk (a luggage room). The ignition on (IG-ON) of the vehicle 10 may include ON of a power supply to an electric motor in the vehicle 10 using the electric motor as a main power source, in addition to startup of an engine in the vehicle 10 using the engine as a main power source. Hereinafter, in the embodiment, description will be given on the premise that the vehicle 10 includes an engine 117 to be described below as a main power source, the activation (IG-ON) of the vehicle 10 corresponds to startup of the engine 117, and stopping (IG-OFF) of the vehicle 10 corresponds to stopping of the engine 117.

The vehicle 10 is communicably connected to the center server 30 over a predetermined communication network (for example, a mobile phone network or an Internet network in which a plurality of base stations is terminations). The vehicle 10 transmits position information to the center server 30, as described below.

The vehicle 10 includes a vehicle 10A owned by an individual and a vehicle 10B owned by a company providing a business to consumer (B2C) car sharing service to be described below.

The mobile terminal 20 is communicably connected to the center server 30 over a predetermined communication network (for example, a mobile phone network or an Internet network in which a plurality of base stations is terminations). The mobile terminal 20 can unlock or lock the vehicle 10 by acquiring authentication key information (an example of key information. The authentication key information is hereinafter referred to as "authentication key") distributed from the center server 30 and transmitting the acquired authentication key to the vehicle 10 through relatively short distance wireless communication according to a predetermined manipulation of the user. The mobile terminal 20 may be, for example, a general-purpose mobile phone, a smartphone, or a tablet terminal. As will be described below, a predetermined application program (hereinafter referred to as a "key application") installed in the built-in processing device 23 is activated, and thereby, the above-described function may be realized. The mobile terminal 20 may be a dedicated mobile terminal specialized for unlocking of the doors of the vehicle 10 and activation of the vehicle 10 by acquiring the authentication key from the center server 30 and using the acquired authentication key. The mobile terminal 20 includes mobile terminals 20Aa to 20Ad corresponding to the vehicle 10A and a mobile terminal 20B corresponding to the vehicle 10B.

The mobile terminal 20Aa is a mobile terminal carried by an owner (hereinafter referred to as an "owner user") among regular users of the vehicle 10A (hereinafter referred to as "regular users"). The mobile terminal 20Aa may bidirectionally communicate with the mobile terminal 20Ab through wireless communication at a relatively short distance.

The mobile terminal 20Ab is a mobile terminal carried by a regular user other than the owner user of the vehicle 10A (for example, including a family member of the owner user and a close friend of the owner user. The regular user is hereinafter referred to as a "sub-user").

The sub-user may include a user who does not drive the vehicle 10A or a user who cannot drive (for example, an owner user's child under 18 years of age). This is because, for example, when solely a trunk delivery service to be described below is used, the regular user does not need to drive the vehicle 10A.

The mobile terminal 20Ac is carried by a deliverer of a company that provides a trunk delivery service to be described below (hereinafter simply referred to as a "delivery company"). The mobile terminal 20Ac is communicably connected to the center server 30 and a delivery management server 50 to be described below over a predetermined communication network (for example, a mobile phone network or an Internet network in which a plurality of base stations is terminations).

The mobile terminal 20Ad is a mobile terminal carried by a borrower of the vehicle 10A in a consumer to consumer (C2C) car sharing service to be described below. The mobile terminal 20Ad is communicably connected to the center server 30 and a C2C car sharing management server 70 to be described below over the predetermined communication network (for example, a mobile phone network or an Internet network in which a plurality of base stations is terminations).

The mobile terminal 20B is a mobile terminal carried by the borrower of the vehicle 10B in a B2C car sharing service to be described below. The mobile terminal 20B is communicably connected to the center server 30 and a B2C car sharing management server 80 to be described below over the predetermined communication network (for example, a mobile phone network or an Internet network in which a plurality of base stations is terminations).

The center server 30 is communicably connected to the vehicle 10, the mobile terminal 20, and the service management server 40.

The center server 30 (an example of a delivery assistance device) manages issuance of an authentication key of the vehicle 10. For example, the center server 30 issues the authentication key according to a predetermined condition and distributes the authentication key to the mobile terminal 20.

The center server 30 acquires position information of the vehicle 10 from the vehicle 10. Accordingly, the center server 30 can recognize the position of the vehicle 10.

The center server 30 operates the car sharing service for sharing the vehicle 10A among a plurality of regular users including the owner user of the vehicle 10A. Specifically, the center server 30 operates a service for sharing the authentication key of the vehicle 10A that each of a plurality of pre-registered regular users including the owner user can acquire in the mobile terminal 20 of the regular user (the mobile terminals 20Aa and 20Ab) (a key sharing service).

The center server 30 performs a registration process (a use registration process) of allowing the regular user of the vehicle 10A to use a service for using the vehicle 10A (a key sharing service, a trunk delivery service, a C2C car sharing service, or the like). Specifically, the center server 30 registers an authority to distribute the authentication key to the predetermined mobile terminal 20 (hereinafter referred to as an "authentication key arrangement authority") by a key sharing management unit 3207 or a service management server 40 to be described below transmitting an authentication key arrangement request to be described below in order for the regular user of the vehicle 10A to use the service for using the vehicle 10A.

The center server 30 manages a use situation of the vehicle 10A through a plurality of services (that is, a plurality of companies) through a trunk delivery service, a C2C car sharing service, and the like to be described below.

The service management server 40 operates and manages various services that are provided using the vehicle 10. The service management server 40 includes a delivery management server 50 and an EC server 60 corresponding to the trunk delivery service, a C2C car sharing management server 70 corresponding to the C2C car sharing service, a B2C car sharing management server 80 corresponding to the B2C car sharing service.

The trunk delivery service may include a delivery service in which a product ordered at an EC site to be described below is a delivery target, and a delivery service in which a product other than the product ordered at the EC site is a delivery target. For example, the trunk delivery service in which the product other than the product ordered at the EC site is the delivery target is a service in which the regular user of the vehicle 10A can change a delivery destination to the trunk of the vehicle 10A when there is a notification indicating that a luggage destined for a house is scheduled to be delivered, from the delivery management server 50 to the regular user of the vehicle 10A through an e-mail, an account of social networking service (SNS), or a specific application program activated at mobile terminals 20Aa and 20Ab. Hereinafter, in the embodiment, description will be given while focusing on the trunk delivery service in which the product ordered at the EC site is the delivery target. An operation of each configuration related to the trunk delivery service to be described below can be appropriately applied to an operation of each configuration in the trunk delivery service in which the product other than the product ordered at the EC site is the delivery target.

The delivery management server 50 is communicably connected to the mobile terminal 20Ac and the center server 30 over a predetermined communication network, and performs an operation and management of a distribution system related to the trunk delivery service from reception of the luggage to the delivery of the luggage to the trunk of the vehicle 10A.

A delivery company operating the delivery management server 50 may provide the regular user of the vehicle 10A with a delivery service in which a vehicle cabin other than the trunk of the vehicle 10A can be designated as a delivery destination in place of the trunk of the vehicle 10A or in addition to the trunk of the vehicle 10A. Hereinafter, the delivery service in which the vehicle cabin (that is, the inside of the vehicle 10A) including the trunk of the vehicle 10A can be designated as the delivery destination is referred to as an "in-vehicle cabin delivery service". The delivery company operating the delivery management server 50 may provide the regular user of the vehicle 10A with a collection service in which the vehicle cabin can be designated as a luggage collection source (hereinafter referred to as "in-vehicle cabin collection service"), as well as the in-vehicle cabin delivery service. That is, the delivery management server 50 may perform an operation and management of the in-vehicle cabin collection service in place of the in-vehicle cabin delivery service or in addition to the in-vehicle cabin delivery service. In the above-described case, the luggage that is a luggage collection target may be a product (that is, a product purchased at the EC site) returning to an operating company of the EC site corresponding to the EC server 60 (or a store opened at the EC site) or may be a luggage for delivery not related to the EC site. The in-vehicle cabin collection service may be realized as a collection service when a company (for example, a company for cleaning) that provides a service in a form of temporarily keeping products from a consumer keeps a luggage from the regular user of the vehicle 10A. In the above-described case, a cleaning company or the like may provide a collection management server that operates and manages the in-vehicle cabin collection service, which can be included in the service management server 40, as in the delivery management server 50. That is, the collection management server may be provided, in place of the delivery management server 50 or in addition to the delivery management server 50. A recovery service in which the vehicle cabin can be designated as a recovery source of articles that are recovery targets (hereinafter referred to as an "in-vehicle cabin recovery service") may be provided to the regular user of the vehicle 10A by a company that provides a service in a form of recovering predetermined articles (articles such as waste or a second-hand book desired to be purchased) from consumers (for example, a waste collection company or an antique purchase company). In the above-described case, a recovery management server that operates and manages the in-vehicle cabin recovery service, which may be included in the service management server 40, may be provided by a waste recovery company or the like, similar to the delivery management server 50. That is, the recovery management server may be provided, in place of the delivery management server 50 or in addition to the delivery management server 50.

The EC server 60 is communicably connected to the center server 30 and the delivery management server 50 over a predetermined communication network, and operates a predetermined website (an EC site) for selling products or services. More specifically, the EC server 60 displays the trunk of the vehicle 10A as an option of the delivery destination on an order screen of the EC site, for regular users of the vehicle 10A and a delivery company (a delivery company corresponding to the delivery management server 50) that have been registered in advance. Accordingly, the regular user of the vehicle 10A can have the purchased product delivered to the trunk of the vehicle 10A even when the regular user is absent at a house.

The C2C car sharing management server 70 is communicably connected to the mobile terminal 20Ad and the center server 30, and performs an operation and management of the C2C car sharing service that assists in lending and borrowing of the vehicle 10A between individuals. For example, the C2C car sharing management server 70 performs reception of registration of a date and time when the vehicle 10A can be lent by the owner user, reception of reservation of use from a person who wants to borrow the vehicle 10A, and arrangement of the authentication key of the vehicle 10A. The C2C car sharing management server 70 may operate and manage the C2C trunk sharing service in an aspect in which the inside of the vehicle cabin of the vehicle 10A of an individual or the trunk thereof is lent as a temporary luggage storage place, a luggage delivery destination, or the like.

The B2C car sharing management server 80 is communicably connected to the mobile terminal 20B and the center server 30, and performs an operation and management of the B2C car sharing service in which the vehicle 10B owned by a predetermined company (for example, a provider of the B2C car sharing service) is lent in an aspect in which the vehicle 10B can be shared among a plurality of general consumers. For example, the B2C car sharing management server 80 performs an operation and management of the B2C car sharing service such as reception of reservation of use of the vehicle 10B, and arrangement of a parking position of the vehicle 10B and the authentication key of the vehicle 10B. The B2C car sharing management server 80 may operate and manage the B2C trunk sharing service in an aspect in which the inside of the vehicle cabin of the vehicle 10B or the trunk is lent as a temporary luggage storage space or a luggage delivery destination.

A company car use management server that operates a car sharing service (a company car use management service) in which an employee of a company is a borrower, with the vehicle 10 as a company car of the company being a reservation of use target, may be included in the service management server 40, instead of the B2C car sharing management server 80 or in addition to the B2C car sharing management server 80. In the above-described case, when there is an idle time period of the vehicle 10, which is the company car, the C2C car sharing management server 70 may operate the C2C car sharing service, with the vehicle 10 as a company car being a borrowing target. The delivery management server 50 and the EC server 60 may operate the trunk delivery service in which a delivery destination of a luggage to be delivered to a company can be designated as a trunk of the vehicle 10 that is a company car of the company.

Details of Configuration Regarding Locking, Unlocking, and Activation of Vehicle A configuration regarding locking, unlocking, and activation of vehicle 10 in the authentication key management system 1 will be described with reference to FIG. 2.

Figure 2:
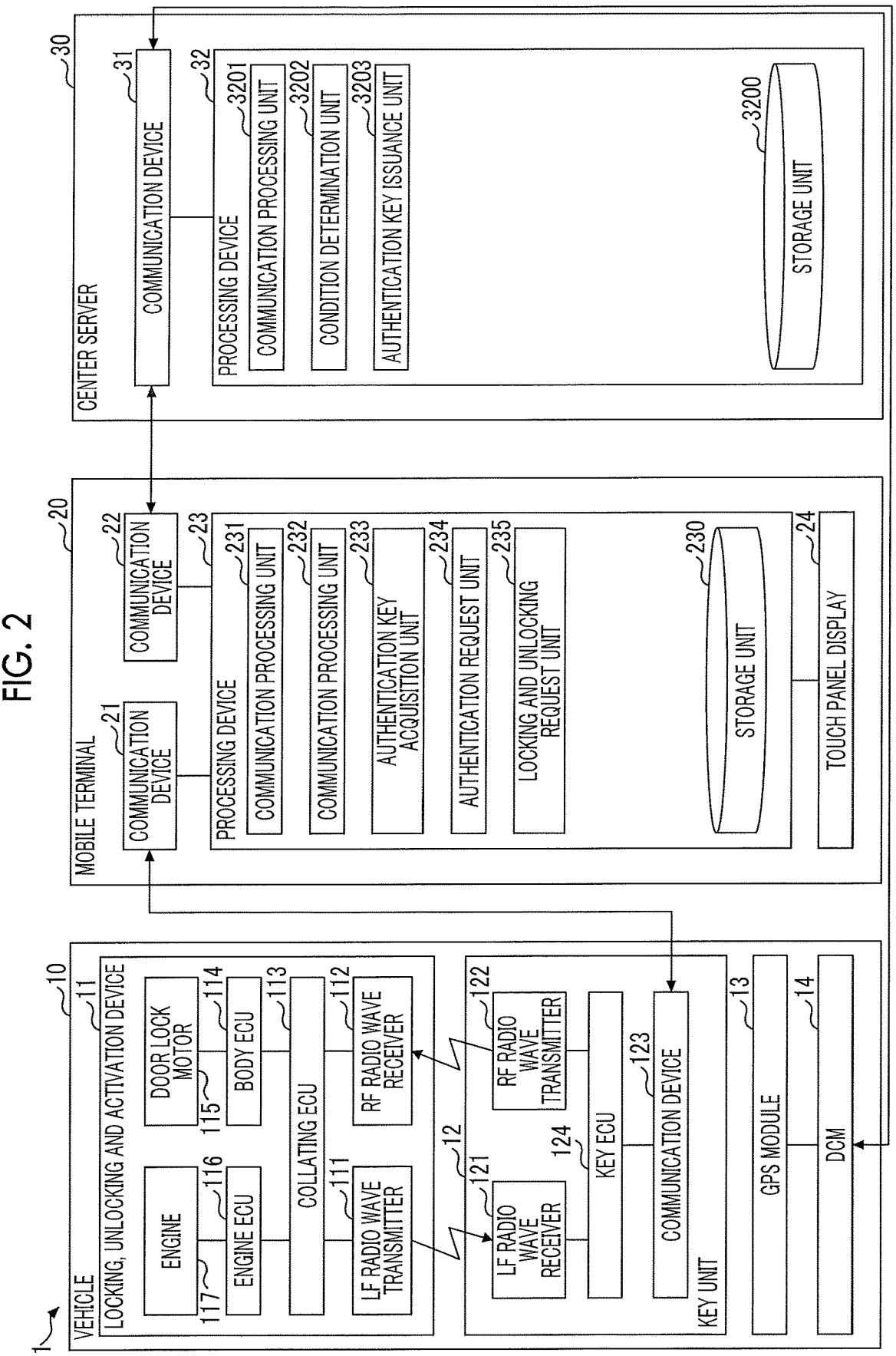
FIG. 2 is a diagram mainly illustrating an example of a configuration regarding locking and unlocking of a vehicle in the authentication key management system.

FIG. 2 is a diagram mainly illustrating an example of the configuration regarding locking, unlocking, and activation of the vehicle 10 in the authentication key management system 1. The vehicle 10 includes a locking, unlocking and activation device 11, a key unit 12, a global positioning system (GPS) module 13, and a data communication module (DCM) 14.

The locking, unlocking and activation device 11 is attached to the vehicle 10 and performs unlocking and locking of the doors of the vehicle 10 according to a locking signal and an unlocking signal to be transmitted as radio waves in a radio frequency (RF) band (for example, 300 MHz to 3 GHz) (hereinafter referred to as "RF radio waves") from the key unit 12. The locking, unlocking and activation device 11 activates the vehicle 10 according to exchange using radio waves in a low frequency (LF) band (for example, 30 Hz to 300 kHz) (hereinafter referred to as "LF radio waves") and RF radio waves with the key unit using a pressing manipulation of an activation switch (not illustrated) provided in the vehicle cabin of the vehicle 10 as a trigger. The locking, unlocking and activation device 11 includes an LF radio wave transmitter 111, an RF radio wave receiver 112, a collating electronic control unit (ECU) 113, a body ECU 114, a door lock motor 115, an engine ECU 116, and an engine 117 as a driving power source of the vehicle 10.

The locking, unlocking and activation device 11 operates with power supplied from an auxiliary battery (not illustrated) mounted on the vehicle 10.

The LF radio wave transmitter 111 is embedded into, for example, a center console or a door handle in the vehicle cabin, and transmits LF radio waves under the control of the collating ECU 113.

The RF radio wave receiver 112 is provided, for example, in a trim of a luggage room of the vehicle 10 and receives RF radio waves under the control of the collating ECU 113.

The collating ECU 113 is an electronic control unit that controls locking and unlocking of the doors of the vehicle 10 and activation of the vehicle 10 based on exchange of signals with the key unit 12. The collating ECU 113 is realized by any hardware, any software, or a combination of any hardware and any software. For example, the collating ECU 113 is configured mainly of a microcomputer includes a central processing unit (CPU), a random access memory (RAM), a read only memory (ROM), an auxiliary storage device, a real time clock (RTC), and a communication interface. The collating ECU 113 realizes various control processes by executing various programs stored in the ROM or the auxiliary storage device on the CPU. Hereinafter, the same applies to the key ECU 124 to be described below.

The collating ECU 113 receives an unlocking signal and a locking signal transmitted as RF radio waves from the key unit 12 using the RF radio wave receiver 112.

When the collating ECU 113 receives the unlocking signal or the locking signal, the collating ECU 113 performs authentication of a transmission source (the key unit 12) of the unlocking signal or the locking signal based on key information included in the unlocking signal or the locking signal (hereinafter referred to as "internal key information"). For example, when the internal key information registered in an internal memory such as an auxiliary storage device in advance matches the internal key information included in the unlocking signal or the locking signal, the collating ECU 113 determines that the authentication is successful, and when the internal key information registered in the internal memory such as the auxiliary storage device in advance does not match the internal key information included in the unlocking signal or the locking signal, the collating ECU 113 determines that the authentication fails.

For example, the collating ECU 113 may transmit LF radio waves including a "challenge" created in a predetermined method using the internal key information of the internal memory from the LF radio wave transmitter 111 to the key unit 12 and perform challenge response authentication based on a "response" replied from the key unit 12, which is received from the RF radio wave receiver 112.

When the authentication is successful, the collating ECU 113 transmits an unlocking command (upon reception of the unlocking signal) or a locking command (upon reception of the locking signal) to the body ECU 114 via an in-vehicle network such as a controller area network (CAN).

As will be described below, in the unlocking signal, solely some of the doors of the vehicle 10 may be designated as unlocked targets. In the above-described case, the collating ECU 113 designates the door as an unlocked target in the unlocking command. Accordingly, the body ECU 114 can operate solely the door lock motor 115 corresponding to some designated doors and unlock solely some doors.

When the above-described activation switch is pressed, the collating ECU 113 performs authentication of the key unit 12 by exchanging signals with the key unit 12 using the LF radio wave transmitter 111 and the RF radio wave receiver 112.

For example, the collating ECU 113 transmits a request signal in an LF band from the LF radio wave transmitter 111 to the key unit 12 to request reply of the internal key information. When a response signal including the internal key information is received from the key unit 12 by the RF radio wave receiver 112, the collating ECU 113 determines authentication success or authentication failure based on matching between the internal key information registered in the internal memory in advance and the internal key information included in the response signal, as in the case of locking and unlocking the doors.

For example, the collating ECU 113 may perform challenge response authentication, as in the case of locking and unlocking of doors.

When the authentication has succeeded, the collating ECU 113 transmits a startup command of the engine 117 to the engine ECU 116 through the in-vehicle network such as the CAN.

The body ECU 114 is an electronic control unit that performs operation control of the door lock motor 115 that is communicably connected via a one-to-one communication line or the like. The body ECU 114 outputs a control command to cause the door lock motor 115 to perform an unlocking operation according to the unlocking command from the collating ECU 113. The body ECU 114 outputs a control command to cause the door lock motor 115 to perform a locking operation according to the locking command from the collating ECU 113.

The door lock motor 115 is a known electric actuator that unlocks and locks the doors of the vehicle 10 according to the control command from the body ECU 114.

The engine ECU 116 is an electronic control unit that drives and controls the engine 117. Specifically, the engine ECU 116 drives and controls various actuators such as a starter or an injector, which are mounted on the engine 117. When the startup command is input from the collating ECU 113, the engine ECU 116 outputs a control command to various actuators such as a starter or an injector of the engine 117 to start up the engine 117.

The key unit 12 is disposed in the vehicle cabin of the vehicle 10 and transmits the unlocking signal and the locking signal as RF radio waves to the locking, unlocking and activation device 11 according to of the unlocking request and the locking request transmitted from the mobile terminal 20. The key unit 12 performs exchange of signals with the locking, unlocking and activation device 11 according to the signal in the LF band transmitted from the locking, unlocking and activation device 11 when the activation switch provided in the vehicle cabin of the vehicle 10 is pressed. The key unit 12 includes an LF radio wave receiver 121, an RF radio wave transmitter 122, a communication device 123, and a key ECU 124.

The key unit 12 may be disposed at a position (for example, a glove box, or the inside of a center console box) at which it is difficult for users seated on respective seats of the vehicle 10 to visually recognize the key unit 12. The key unit 12 may be fixed or may not be fixed to the vehicle 10. The key unit 12 may be operated by a built-in button battery or the like or may be operated by power supplied from an auxiliary battery mounted on the vehicle 10.

The LF radio wave receiver 121 receives the LF radio waves under the control of the key ECU 124.

The RF radio wave transmitter 122 transmits RF radio waves under the control of the key ECU 124.

The communication device 123 is any device that performs near field communication with the mobile terminal 20 under the control of the key ECU 124. The communication device 123 may be, for example, a BLE communication module that performs communication with the mobile terminal 20 in compliance with a Bluetooth (registered trademark) low energy (BLE) communication standard. Hereinafter, description will be given on the premise that a communication standard adopted in the communication device 123 conforms to BLE communication.

The communication device 123 may be a communication device conforming to a short-range communication standard having a very short communicable distance, such as a near field communication (NFC) standard. In the above-described case, the communication device 123 may be built, for example, at a position (for example, the inside of the door handle) close to a body surface of the vehicle 10 outside the vehicle cabin. Accordingly, the key unit 12 (the key ECU 124) can communicate with the mobile terminal 20 outside the vehicle cabin even when the communicable distance of the communication device 123 is very short.

The key ECU 124 is an electronic control unit that performs a control process of transmitting a locking signal and an unlocking signal to the locking, unlocking and activation device 11 according to the unlocking request and the locking request received from the mobile terminal 20.

The key ECU 124 receives an authentication request including an authentication key associated with the key unit 12 from the mobile terminal 20 via the communication device 123.

When the authentication request including the authentication key associated with the key unit 12 is received from the mobile terminal 20, the key ECU 124 performs authentication of the mobile terminal 20 based on the authentication key. When the authentication has been successful, the key ECU 124 restores the internal key information stored in an internal memory such as an auxiliary storage device to a usable state. The internal key information is stored in a state that the internal key information cannot be used for authentication in the locking, unlocking and activation device 11, for example, due to a state in which the internal key information is not accessible or a state in which the internal key information has been encrypted. Therefore, when the authentication of the mobile terminal 20 has been successful, the key ECU 124, for example, performs changing of an authority to access the internal memory for changing the key information to an accessible state, or decodes an encrypted internal key information based on the authentication key.

Accordingly, the key ECU 124 can access the internal key information which is not normally accessible to transmit an unlocking signal or a locking signal including the internal key information to the locking, unlocking and activation device 11 or transmit an unlocking signal or a locking signal including decoded internal key information to the locking, unlocking and activation device 11. Therefore, the locking, unlocking and activation device 11 can perform appropriate authentication based on the internal key information included in the unlocking signal and the locking signal. Even when a situation in which a malicious third party illegally obtains the key unit 12 occurs, the internal key information in the key unit 12, for example, is not accessible or is encrypted, occurrence of theft of the vehicle 10 can be suppressed.

The key ECU 124 receives the unlocking request and the locking request from the mobile terminal 20 via the communication device 123. When the authentication of the mobile terminal 20 is successful (specifically, a state in which the BLE communication has been established is kept after the authentication of the mobile terminal 20 has been successful) and the key ECU 124 has received the unlocking request or the locking request from the mobile terminal 20, the key ECU 124 transmits the unlocking signal or the locking signal including locking and unlocking key information to the locking, unlocking and activation device 11 via the RF radio wave transmitter 122.

Accordingly, unlocking or locking of the doors of the vehicle 10 is realized after an authentication process in the locking, unlocking and activation device 11.

As described above, the key ECU 124 performs exchange of signals with the locking, unlocking and activation device 11 according to a signal in the LF band transmitted from the locking, unlocking and activation device 11 when the activation switch provided in the vehicle cabin of the vehicle 10 is pressed.

For example, when the request signal is received from the locking, unlocking and activation device 11 by the LF radio wave receiver 121, the key ECU 124 transmits a response signal including the internal key information stored in the internal memory or the like to the locking, unlocking and activation device 11 via the RF radio wave transmitter 122.

For example, when the LF radio waves including the "challenge" are received from the locking, unlocking and activation device 11 by the LF radio wave receiver 121, the key ECU 124 generates a "response" based on the internal key information and transmits the response to the locking, unlocking and activation device 11 via the RF radio wave transmitter 122.

Accordingly, after the authentication process in the locking, unlocking and activation device 11, the startup of the engine 117 is realized.

An authority regarding a function of locking, unlocking, or activating the vehicle 10 imparted by the center server 30 may be defined in the authentication key.

For example, when the authentication key has solely the authority to unlock some of the doors of the vehicle 10, the key ECU 124 transmits an unlocking signal including information for designating the door to be unlocked to the key unit 12 via the RF radio wave transmitter 122. Accordingly, solely some of the doors of the vehicle 10 can be unlocked as described above.

For example, when the authentication key does not have the authority to activate the engine 117, the key ECU 124 may not perform exchange with the locking, unlocking and activation device 11 even when the signal in the LF band from the locking, unlocking and activation device 11 based on a pressing manipulation of the activation switch is received by the LF radio wave receiver 121. Accordingly, it is possible to prohibit the activation of the engine 117 according to the authority of the authentication key.

The GPS module 13 receives GPS signals transmitted from three or more satellites and, desirably, four or more satellites over the vehicle 10, and measures a position of the vehicle 10. The GPS module 13 is communicably connected to the DCM 14 or the like via a one-to-one communication line or an in-vehicle network such as a CAN, and the measured position information of the vehicle 10 is input to the DCM 14 or the like.

The DCM 14 is a communication device that bidirectionally communicates with the center server 30 over a predetermined communication network. The DCM 14 transmits current position information of the vehicle 10 input from the GPS module 13 to the center server 30 at a predefined timing or according to a request from the center server 30, or the like. The DCM 14 transmits, to the center server 30, various types of vehicle information (for example, information indicating that unlocking of the door of the vehicle 10 or activation of the vehicle 10 is performed based on the authentication key) that can be acquired over an in-vehicle network such as a CAN at a predefined timing or according to a request from the center server 30 or the like.

The mobile terminal 20 includes a communication device 21, a communication device 22, a processing device 23, and a touch panel display (hereinafter simply referred to as a "display") 24.

The communication device 21 is any device that performs near field communication with the mobile terminal 20 according to the same communication standard as that of the communication device 123. As described above, in the case of the embodiment, the communication device 21 is, for example, a BLE communication module.

The communication device 22 is any device that communicates with the center server 30, the service management server 40, or the like over a predetermined communication network. The communication device 22 is a mobile communication module corresponding to a communication standard such as Long Term Evolution (LTE), 4th Generation (4G), or 5th Generation (5G).

The processing device 23 performs various control processes in the mobile terminal 20. The functions of the processing device 23 may be realized by any hardware, any software, or a combination of any hardware and any software, and includes for example, a CPU, a RAM, a ROM, an auxiliary storage device, an RTC, and various interfaces for communication. The processing device 23 includes, for example, a communication processing unit 231, a communication processing unit 232, an authentication key acquisition unit 233, an authentication request unit 234, and a locking and unlocking request unit 235 as functional units that are realized by executing one or more programs stored in the ROM or the auxiliary storage device on the CPU. The processing device 23 includes, for example, a storage unit 230 that is realized as a storage area in the auxiliary storage device, and a process of storing various pieces of data in the storage unit 230 is realized by a predetermined program stored in the ROM or the auxiliary storage device.

The communication processing unit 231 performs bidirectional near field communication with the key unit 12 using the communication device 21 and performs transmission and reception of various signals.

The communication processing unit 232 connects to the predetermined communication network using the communication device 22 and transmits and receives various signals such as a data signal or a control signal to and from the center server 30, the service management server 40, and the like.

The authentication key acquisition unit 233 acquires the authentication key from the center server 30, for example, according to a predetermined manipulation of the user with respect to a predetermined graphical user interface (GUI) displayed on the display 24, and stores the acquired authentication key in the storage unit 230. Hereinafter, the description will be given on the premise that various manipulations with respect to the mobile terminal 20 are performed by a manipulation with respect to the GUI displayed on the display 24 in conjunction with the operation of the key application.

For example, the authentication key acquisition unit 233 of the mobile terminal 20Aa transmits an authentication key acquisition request to the center server 30 via the communication processing unit 232. Accordingly, the center server 30 receives the authentication key acquisition request, and issues the authentication key when the center server 30 determines that the authentication key acquisition request is a regular authentication key acquisition request. The authentication key acquisition unit 233 acquires the authentication key distributed from the center server 30 via the communication processing unit 232.

For example, the authentication key acquisition unit 233 of the mobile terminal 20Ab acquires the authentication key distributed from the center server 30 to the mobile terminal 20Ab via the communication processing unit 232 according to a key sharing request (to be described below) transmitted from the mobile terminal 20Aa to the center server 30.

The authentication key acquisition unit 233 of the mobile terminal 20Ab may transmit the authentication key acquisition request by itself to the center server 30 via the communication processing unit 232. In the above-described case, when the center server 30 receives the authentication key acquisition request from the mobile terminal 20Ab, the center server 30 may perform an inquiry about whether or not to permit distribution of the authentication key to the mobile terminal 20Aa of the owner user.

For example, the authentication key acquisition unit 233 of each of the mobile terminals 20Ac, 20Ad, and 20B transmits an authentication key acquisition request to the delivery management server 50, the C2C car sharing management server 70, and the B2C car sharing management server 80 to request acquisition of the authentication key. Accordingly, the delivery management server 50, the C2C car sharing management server 70, and the B2C car sharing management server 80 transmit an authentication key arrangement request to the center server 30 according to reception of the authentication key acquisition request, and the center server 30 issues the authentication key according to reception of the authentication key arrangement request. The authentication key acquisition unit 233 acquires an authentication key that is distributed from the center server 30 via the communication processing unit 232.

The authentication key acquisition unit 233 of the mobile terminals 20Ac, 20Ad, and 20B may transmit the authentication key acquisition request to the center server 30 via the communication processing unit 232. In the above-described case, the center server 30 may perform an inquiry of the delivery management server 50, the C2C car sharing management server 70, and the B2C car sharing management server 80 to determine whether or not the authentication key acquisition request is a regular authentication key acquisition request.

The authentication request unit 234 transmits an authentication request to the key unit 12 of the vehicle 10 via the communication processing unit 231 to request authentication of the mobile terminal 20 serving as a remote manipulation unit for locking and unlocking the doors of the vehicle 10. For example, when the authentication request unit 234 finds a key unit corresponding to the authentication key, and specifically, when an advertising packet corresponding to the key unit 12 is received by the communication processing unit 231, the authentication request unit 234 may transmit the authentication request to the key unit 12. For example, the authentication request unit 234 may transmit the authentication request to the key unit 12 according to a predetermined manipulation by the user.

The locking and unlocking request unit 235 transmits an unlocking request including an authentication key or a locking request including the authentication key to the key unit 12 via the communication processing unit 231 according to the predetermined manipulation by the user. Accordingly, even when the unlocking request or the locking request has been transmitted to the key unit 12 before the authentication request is transmitted by the authentication request unit 234, locking and unlocking of the door of the vehicle 10 based on the authentication process in the key unit 12 can be realized. For example, an unlocking button for requesting unlocking of the vehicle 10 and a locking button for requesting locking of the vehicle 10 may be drawn in a GUI serving as a manipulation screen of the display 24, a locking request may be transmitted when the locking button is touched, and an unlocking request may be transmitted when the unlocking button is touched. The locking request and the unlocking request may be transmitted by a manipulation with respect to a predetermined manipulation unit by hardware provided in the mobile terminal 20.

For example, the functions of the authentication key acquisition unit 233, the authentication request unit 234, and the locking and unlocking request unit 235 may be available to the user by a predetermined application program installed in the ROM of the processing device 23, the auxiliary storage device, or the like being activated. Hereinafter, the description will be given on the premise that the functions of the authentication key acquisition unit 233, the authentication request unit 234, and the locking and unlocking request unit 235 of the processing device 23 are available to the user by the key application already installed in the processing device 23 (the auxiliary storage device or the ROM) being activated.

The center server 30 includes a communication device 31 and a processing device 32.

The functions of the center server 30 may be shared and realized by a plurality of servers. Hereinafter, the same applies to the delivery management server 50, the EC server 60, the C2C car sharing management server 70, and the B2C car sharing management server 80.

The communication device 31 is any device that performs bidirectional communication with each of the vehicle 10, the mobile terminal 20, and the service management server 40 over a predetermined communication network.

The processing device 32 (an example of the information processing device) performs various control processes in the center server 30. The functions of the processing device 32 may be realized by any hardware, any software, or a combination of any hardware and any software, and the processing device 32 is mainly configured of one or a plurality of server computers including, for example, a CPU, a RAM, a ROM, an auxiliary storage device, an RTC, and a predetermined communication interface. Hereinafter, the same applies to processing devices 52, 62, 72, 82 to be described below of the delivery management server 50, the EC server 60, the C2C car sharing management server 70, and the B2C car sharing management server 80. The processing device 32 includes, for example, a communication processing unit 3201, a condition determination unit 3202, and an authentication key issuance unit 3203 as functional units that are realized by executing one or more programs stored in the ROM or the auxiliary storage device on the CPU. The processing device 32 includes, for example, a storage unit 3200 that is realized as a storage area defined in an auxiliary storage device of a server computer or an external storage device connected to the server computer, and a process in which various pieces of data are stored in the storage unit 3200 is realized by a program stored in the ROM or the auxiliary storage device. Hereinafter, the same applies to the storage units 520, 620, 720, and 820 to be described below.

The communication processing unit 3201 controls the communication device 31 to perform exchange of various signals such as control signals and information signals with the vehicle 10, the mobile terminal 20, and the service management server 40.

The condition determination unit 3202 determines whether or not the authentication key acquisition request or the authentication key arrangement request is a regular authentication key acquisition request or a regular authentication key arrangement request according to reception of an authentication key acquisition request from the mobile terminal 20 or an authentication key arrangement request from the service management server 40 received by the communication processing unit 3201.

When the condition determination unit 3202 determines that the authentication key acquisition request or the authentication key arrangement request is the regular one, the authentication key issuance unit 3203 specifies a specification of the authentication key to be issued and issues an authentication key corresponding to the specified specification. For example, the authentication key issuance unit 3203 specifies the vehicle 10 that is a target of locking and unlocking using the authentication key or the key unit 12 corresponding to the vehicle 10. For example, the authentication key issuance unit 3203 specifies the authority of the authentication key regarding a period of time in which the authentication key is valid (available) and the number of times the authentication key is available. For example, the authentication key issuance unit 3203 specifies the authority of the authentication key regarding the unlocking or activation of the vehicle 10, such as lockable and unlockable doors and whether or not the vehicle 10 can be activated. For example, the authentication key issuance unit 3203 specifies the authority of the authentication key regarding the temporary key sharing, such as whether or not the authentication key can be shared with another mobile terminal 20 through a temporary key sharing to be described below, a period of time in which the authentication key can be shared with the other mobile terminal 20, and the number of times the authentication key can be shared with the other mobile terminal 20. Hereinafter, the authority of the authentication key regarding the period of time in which the authentication key is available, the number of times the authentication key is available, and the like, the authority of the authentication key regarding the unlocking or activation of the vehicle 10, and the authority of the authentication key regarding the temporary key sharing are collectively simply referred to as "various authorities of the authentication key". The authentication key issuance unit 3203 distributes the authentication key issued to the mobile terminal 20 that is a target via the communication processing unit 3201.

Details of Configuration Regarding Key Sharing Service

A configuration regarding the key sharing service in the authentication key management system 1 will be described with reference to FIG. 3.

Figure 3:
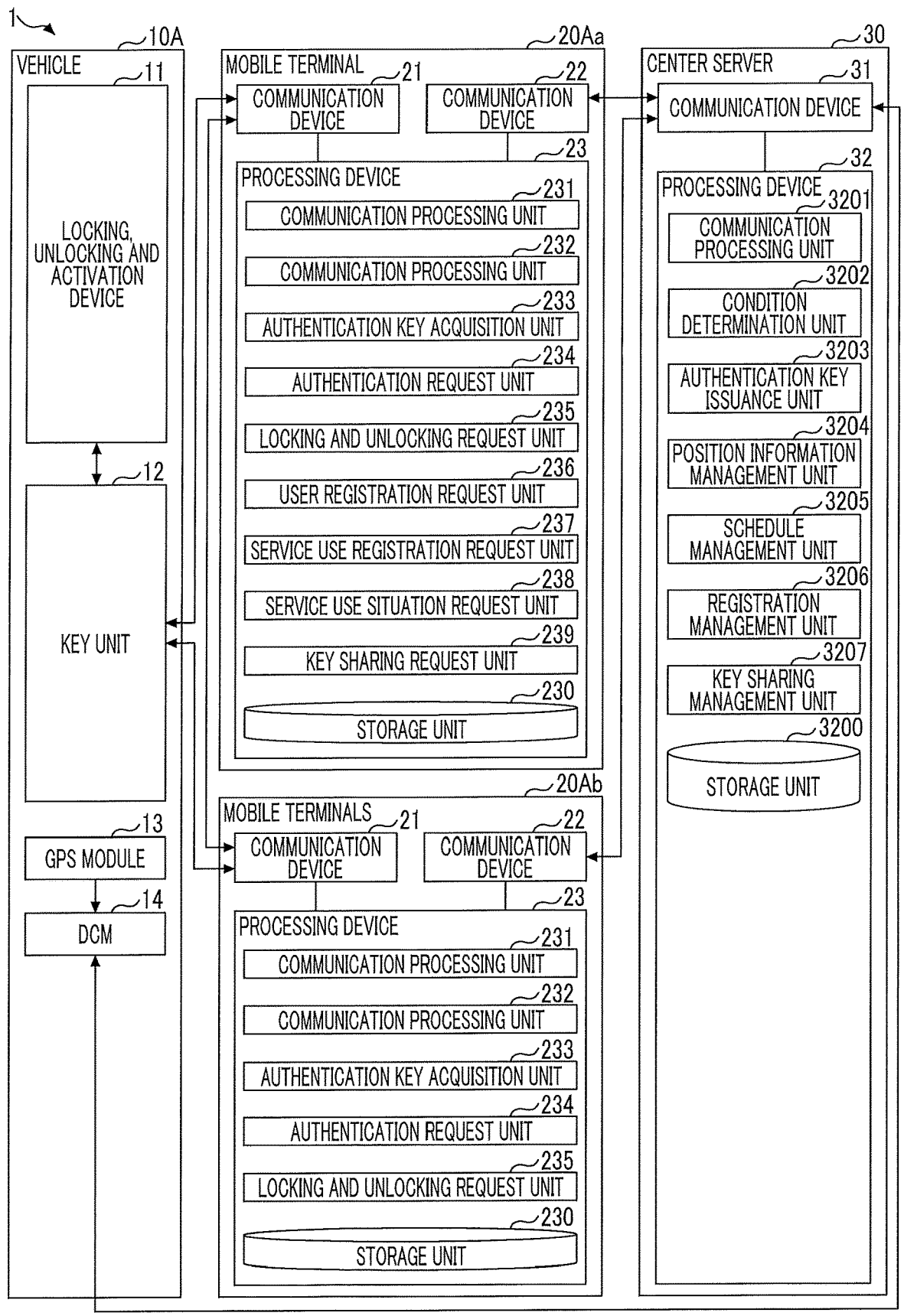
FIG. 3 is a diagram mainly illustrating an example of a configuration regarding a key sharing service in the authentication key management system.

FIG. 3 is a diagram mainly illustrating an example of a configuration regarding the key sharing service in the authentication key management system 1. Hereinafter, a configuration regarding the key sharing service in the authentication key management system 1 will be mainly described with reference to FIG. 3, and duplicate description on the configuration overlapping the configuration regarding locking, unlocking, and activation of the vehicle 10 described above will be omitted as much as possible. Hereinafter, the same applies to description of FIGS. 4 to 6.

The processing device 23 of the mobile terminal 20Aa carried by the owner user of the vehicle 10A includes the communication processing unit 231, the communication processing unit 232, the authentication key acquisition unit 233, the authentication request unit 234, and the locking and unlocking request unit 235, as described above. The processing device 23 of the mobile terminal 20Aa further includes a user registration request unit 236, a service use registration request unit 237, a service use situation request unit 238, and a key sharing request unit 239 as functional units that are realized by executing one or more programs stored in the ROM or the auxiliary storage device on the CPU.

In the embodiment, the description will be given on the premise that the functions of the user registration request unit 236, the service use registration request unit 237, the service use situation request unit 238, and the key sharing request unit 239 of the mobile terminal 20Aa are available to the owner user by the key application being activated and the user authentication based on bidirectional communication with the center server 30 being successful. The description will be given on the premise that the user authentication is performed by the center server 30 based on an identification (ID) defined for the owner user (hereinafter referred to as "owner user ID") in advance and a password corresponding to the owner user ID.

The user registration request unit 236 requests the center server 30 to register the regular user of the vehicle 10A that uses various services (the key sharing service, the trunk delivery service, the C2C car sharing service, and the like) for using the vehicle 10A, according to a predetermined manipulation by the owner user. For example, the user registration request unit 236 transmits a user registration request including an owner user ID and a password and attribute information (for example, a name, age, and relationship with the owner user) for specifying a sub-user who is a registration target to the center server 30 via the communication processing unit 232.

When a notification indicating that registration of the sub-user has been completed (user registration completion notification) is received from the center server 30 by the communication processing unit 232, the user registration request unit 236 stores an ID (hereinafter referred to as a "sub-user ID") and a password of the sub-user included in the user registration completion notification in the storage unit 230. In the above-described case, the user registration request unit 236 may transmit the sub-user ID and the password to the mobile terminal 20Ab carried by the registered sub-user via the communication processing unit 231 according to a predetermined manipulation by the owner user.

The service use registration request unit 237 requests the center server 30 to perform registration of use of various services for using the vehicle 10A by the regular user of the vehicle 10A according to a predetermined manipulation by the owner user. That is, the service use registration request unit 237 requests registration of the authentication key arrangement authority of the key sharing management unit 3207 or the service management server 40 corresponding to various services for allowing regular users of the vehicle 10A to use various services, as described above. For example, the service use registration request unit 237 transmits a service use registration request including the owner user ID and the password, the information for specifying the vehicle 10A to be used for various services, the information for specifying the service that is a target, and the ID of the regular user who uses the target service (the owner user ID or the sub-user ID) to the center server 30 via the communication processing unit 232. Hereinafter, the owner user ID and the sub-user ID may be collectively referred to as a "regular user ID". Accordingly, the service use registration request unit 237 can register a sub-user who uses the key sharing service in the center server 30.

The service use registration request unit 237 receives a notification that the use registration of the service based on the service use registration request has been completed from at least one of the center server 30 and the service management server 40 through the communication processing unit 232. The service use registration request unit 237 causes the display 24 to display an indication that the use registration of the specific service by the regular user of the vehicle 10A based on the predetermined manipulation by the owner user has been completed. Accordingly, the owner user can recognize that the use registration of the specific service by the regular user has been completed.

The service use situation request unit 238 requests the center server 30 to provide information on the use situation of various services (service use situation information) including the key sharing service by the regular user of the vehicle 10A for which the use registration has been completed in a form corresponding to the owner user ID according to a predetermined manipulation by the owner user. For example, the service use situation request unit 238 transmits a service use situation request including the owner user ID and the password to the center server 30 via the communication processing unit 232. When the service use situation information received from the center server 30 by the communication processing unit 232 is received, the service use situation request unit 238 displays the service use situation information on the display 24. Accordingly, the owner user can centrally recognize the information on the use situation of each service by each of the regular users registered for use in the center server 30 in an aspect in which the information is linked to the owner user ID.

The key sharing request unit 239 requests the center server 30 to distribute the authentication key for performing locking, unlocking or activating of the vehicle 10A to the sub-user registered for use in the key sharing service according to a predetermined manipulation by the owner user. For example, the key sharing request unit 239 transmits a key sharing request including an owner user ID and a password, information on the vehicle 10A that is a locking and unlocking target by the authentication key, and information (for example, a sub-user ID) on the sub-user that is a distribution (share) target of the authentication key to the center server 30 via the communication processing unit 232. When the key sharing request unit 239 transmits the key sharing request, use period information (for example, a date and time of use start and a date and time of use end) regarding a period of time in which the authentication key set and distributed by a predetermined manipulation by the owner user is available may be included in the key sharing request. The key sharing request may include authority information on various authorities of the authentication key, such as an authority of the authentication key regarding a period of time in which the authentication key is available or the number of times the authentication key is available, an authority of the authentication key regarding the unlocking or activation of the vehicle, and an authority of the authentication key regarding temporary key sharing to be described below, which can be designated according to the predetermined manipulation by the owner user. Accordingly, as described above, when the authentication key available at the same time is shared among the mobile terminals 20, the owner user can appropriately set authority information such that use of the vehicle 10A by a user other than the owner user can be limited. Therefore, security of the vehicle 10A can be improved.

The key sharing request unit 239 may set the mobile terminals 20 (that is, at least one of the mobile terminals 20Aa and 20Ab) of a plurality of regular users of the vehicle 10A as distribution targets and request the center server 30 to distribute the authentication key of which the periods of time in which the authentication key is available overlap according to the predetermined manipulation by the owner user. That is, in the key sharing request, the regular users that are authentication key distribution targets may be designated, or the owner users may be included among the plurality of regular users. In the key sharing request, the period of time in which the authentication key is available for each of the designated regular users may overlap. Accordingly, the authentication key of the vehicle 10A available at the same time can be shared by the regular users. Therefore, for example, when a plurality of persons gets on the vehicle 10A together and go out for travel, camp, or the like, each of passengers can lock and unlock the vehicle 10A without lending and borrowing the mobile terminal 20 in which the authentication key has been stored, and therefore, convenience for users can be improved.

Even when the key sharing request unit 239 may share the distributed authentication key with another mobile terminal 20 (that is, the mobile terminal 20 in which the key application is installed) according to a predetermined manipulation by the owner user (hereinafter, a sharing aspect of the authentication key will be referred to as "temporary key sharing"). In the above-described case, the other mobile terminal 20 may be the mobile terminal 20Ab of the sub-user or may be the mobile terminal 20 of a user other than the sub-user, that is, a user temporarily using the vehicle 10A.

For example, the key sharing request unit 239 transmits the authentication key (more specifically, a copy of the authentication key) to another mobile terminal 20 via the communication processing unit 231. Accordingly, the owner user of the vehicle 10A can share the authentication key with the other user even when a plurality of persons suddenly get on the vehicle 10A together and go out for traveling or the like. It is possible to share the authentication key available at the same time with the other mobile terminal 20 directly from the mobile terminal 20Aa. Accordingly, for example, even when the mobile terminal 20Aa is at a place at which a communication situation in a wireless mobile communication network is poor or out of a communication range, the owner user of the vehicle 10A can share the authentication key with the other user.

In the above-described case, the key sharing request unit 239 may transmit the authentication key of which the authority regarding the period of time in which the authentication key is available or the number of times the authentication key is available or the authority regarding the unlocking or activation of the vehicle 10A, which is set based on the predetermined manipulation by the owner user or which is defined in advance, has been restricted, to the other mobile terminal 20 via the communication processing unit 231. Specifically, for example, an authentication key with an authority to limit the period of time in which the authentication key is available or the number of times the authentication key is available to, for example, 30 minutes or once, or an authentication key with an authority, for example, solely to lock and unlock doors for getting on and off the vehicle 10A or prohibit activation of the vehicle 10A may be transmitted to another mobile terminal 20. Hereinafter, the same applies to the case of temporary key sharing that is performed via the center server 30. Accordingly, security of the vehicle 10A due to the temporary key sharing can be improved.

When the temporary key sharing is performed, the key sharing request unit 239 may cause the authentication key to be distributed from the center server 30 to the other mobile terminal 20, as in the case of a normal key sharing. In the above-described case, the key sharing request unit 239 may transmit a temporary key sharing request including information (for example, an issued ID embedded in the authentication key) for specifying the distributed authentication key and information for designating the other mobile terminal 20 that is a distribution target to the center server 30 via the communication processing unit 232, to cause the authentication key of the vehicle 10A to be distributed from the center server 30 to the other mobile terminal 20.

For example, when the other mobile terminal 20 is the mobile terminal 20Ab of the sub-user, the key sharing request unit 239 may transmit a temporary key sharing request including the sub-user ID to the center server 30 via the communication processing unit 232.

For example, the key sharing request unit 239 acquires predetermined identification information (for example, a quick response (QR) code (registered trademark) corresponding to the user of another mobile terminal 20 registered as a user installing the key application in the center server 30) from the other mobile terminal 20 via the communication processing unit 231. The key sharing request unit 239 may transmit a temporary key sharing request for designating another mobile terminal 20 specified based on the identification information as a distribution target, to the center server 30.

The mobile terminal 20Aa may acquire the identification information using another method. For example, the mobile terminal 20Aa may acquire identification information corresponding to the user of the other mobile terminal 20 in an aspect in which the identification information displayed on the display 24 of the other mobile terminal 20 is recognized using a mounted camera function. For example, the mobile terminal 20Aa may acquire the identification information transmitted from the user of the other mobile terminal 20 to a mail address or an account of an SNS of the owner user.

For example, according to a predetermined manipulation by the owner user, the key sharing request unit 239 transmits a candidate terminal information request for requesting a candidate terminal information on a candidate terminal that is a candidate for the other mobile terminal 20 present around a current position of the mobile terminal 20Aa to the center server 30 via the communication processing unit 232.

When the candidate terminal information is received from the center server 30 by the communication processing unit 232, the key sharing request unit 239 causes the display 24 to display the candidate terminal information. When the candidate terminal information is displayed on the display 24, information for specifying a candidate terminal in which a specific manipulation or operation is performed among candidate terminals may be included in the candidate terminal information replied from the center server 30. Accordingly, the owner user of the vehicle 10A can specify another mobile terminal 20 from among the candidate terminals displayed on the display 24 of the mobile terminal 20Aa by the user of the other mobile terminal 20 as a key sharing target performing a specific manipulation or operation with respect to the mobile terminal 20. The key sharing request unit 239 may transmit a temporary key sharing request for designating the other mobile terminal 20 specified from among the candidate terminals as a distribution target to the center server 30, according to a predetermined manipulation by the owner user.

The key sharing request unit 239 may activate the key application according to a predetermined manipulation by the owner user to transmit link information according to a uniform resource locator (URL) scheme for allowing the other mobile terminal 20 to acquire the authentication key from the center server 30 (hereinafter, simply referred to as "link information") to a mail address or an account of an SNS of the user of the other mobile terminal 20 via the communication processing unit 232. In the above-described case, the key sharing request unit 239 transmits a temporary key sharing request for designating the acquired authentication key to the center server 30 via the communication processing unit 232 according to a predetermined manipulation by the owner user, and acquires the link information replied from the center server 30 according to the temporary key sharing request. Accordingly, the key sharing request unit 239 can cause the authentication key to be distributed from the center server 30 to the other mobile terminal 20.

The temporary key sharing may be executed from the mobile terminal 20Ab of the sub-user to which the authentication key has already been distributed. That is, a function regarding the temporary key sharing in the key sharing request unit 239 may be included in a function of the key application that is installed in the processing device 23 of the mobile terminal 20Ab of the sub-user. Accordingly, it is not needed to lend and borrow the mobile terminal 20Ab of the sub-user who has acquired the authentication key even when a plurality of persons including no owner user get on the vehicle 10A together, and convenience for the sub-user of the vehicle 10A can be further improved. Hereinafter, description will be given on the premise that the temporary key sharing can be performed from the mobile terminal 20Ab of the sub-user.

The processing device 32 of the center server 30 includes the communication processing unit 3201, the condition determination unit 3202, the authentication key issuance unit 3203, and the storage unit 3200, as described above. The processing device 32 of the center server 30 further includes a position information management unit 3204, a schedule management unit 3205, a registration management unit 3206, and a key sharing management unit 3207.

When the authentication key acquisition request has been received from the mobile terminals 20Aa and 20Ab by the communication processing unit 3201, the condition determination unit 3202 performs authentication based on the regular user ID and the password included in the authentication key acquisition request. For example, the condition determination unit 3202 collates the regular user ID and password registered in the storage unit 3200 with the regular user ID and password included in the authentication key acquisition request, and determines that the authentication is successful, that is, the authentication key acquisition request is a regular authentication key acquisition request when both match.

The condition determination unit 3202 determines whether or not the authentication key arrangement request sent from the key sharing management unit 3207 to be described below is a regular authentication key arrangement request. For example, when the authentication is successful based on authentication information (for example, the ID and the password) included in the authentication key arrangement request from the key sharing management unit 3207, the condition determination unit 3202 may determine that the authentication key arrangement request is a regular authentication key arrangement request.

When the condition determination unit 3202 determines that the authentication key acquisition request or the authentication key arrangement request is a regular authentication key acquisition request or a regular authentication key arrangement request, the authentication key issuance unit 3203 issues the authentication key and distributes the authentication key to the mobile terminal 20 via the communication processing unit 3201.

The position information management unit 3204 acquires the position information from the vehicle 10A via the communication processing unit 3201 and monitors the position information of the vehicle 10A in real time to recognize a movement situation of the vehicle 10A. Accordingly, for example, the position information management unit 3204 can notify the owner user of the position information of the vehicle 10A lent to the sub-user via the communication processing unit 3201. For example, the position information management unit 3204 can notify the mobile terminal 20Ab of the sub-user of information such as whether or not the vehicle 10A scheduled to be lent to the sub-user is directed to a designated position (for example, a house) or a reference for returning, via the communication processing unit 3201.

The schedule management unit 3205 manages the use situation of the vehicle 10A regarding various services. For example, the schedule management unit 3205 periodically acquires a use schedule of the vehicle 10 by the key sharing service and, specifically, information on a date and time on which the authentication key distributed by the key sharing service is available, from the key sharing management unit 3207. The schedule management unit 3205 acquires the use schedule of the vehicle 10A by each of the trunk delivery service and the C2C car sharing service from the delivery management server 50 and the C2C car sharing management server 70 via the communication processing unit 3201. The schedule management unit 3205 generates information on the use schedule of the vehicle 10A (vehicle use schedule information) over a plurality of services based on the acquired use schedule of the vehicle 10A regarding the various services, and updates the vehicle use schedule information stored in the storage unit 3200.

The registration management unit 3206 performs registration of the regular user (the sub-user) who uses various services according to the user registration request received from the mobile terminal 20Aa of the owner user by the communication processing unit 3201. For example, the registration management unit 3206 collates the owner user ID and password included in the user registration request from the mobile terminal 20Aa with the owner user ID and password stored in the storage unit 3200, and determines that the user registration request is a regular user registration request when both match. That is, the registration management unit 3206 determines that the authentication is successful. The registration management unit 3206 registers the sub-user ID included in the regular user registration request in a user service registration information database (DB) in the storage unit 3200 as the regular user who can use various services.

The registration management unit 3206 performs registration of use of various services by the regular user of the vehicle 10A according to the service use registration request received from the mobile terminal 20Aa of the owner user by the communication processing unit 3201. That is, according to the service use registration request, the registration management unit 3206 performs registration of an authentication key arrangement authority of the key sharing management unit 3207 or the service management server 40 corresponding to various services to allow the user of the vehicle 10A to use various services. For example, the registration management unit 3206 performs the same authentication process as described above based on the owner user ID and the password included in the service use registration request from the mobile terminal 20Aa to determine whether the service use registration request is a regular service use registration request. When the service use registration request is a regular service use registration request, the registration management unit 3206 determines whether or not the regular user ID included in the service use registration request has already been registered in the user service registration information DB. When the regular user ID included in the service use registration request has already been registered in the user service registration information DB, the registration management unit 3206 registers the service of a target specified by the service use registration request in the user service registration information database (DB) in the storage unit 3200 as a service available to the regular user corresponding to the regular user ID.

Specifically, the registration management unit 3206 constructs a user service registration information DB in an aspect in which service-specific information for specifying a target service, vehicle-specific information for specifying the vehicle 10A, a regular user ID for specifying a regular user who uses the service, and service link information in which the vehicle-specific information corresponding to the vehicle 10A and the regular user ID are associated with the target service is linked to the owner user ID.

The service-specific information is, for example, a service ID that is defined for each service. Specifically, for example, when there is a plurality of companies providing the C2C car sharing service, a unique service ID is defined for each of the companies. For example, when the same company provides a plurality of C2C car sharing services, a unique ID is defined for each of the services provided by the same company. When a trunk delivery service is provided by a combination of a plurality of delivery companies and a plurality of EC companies, a unique service ID may be defined for each combination of the delivery company and the EC company, and the target service may be specified by a combination of the unique service ID defined for each of the delivery companies and a unique service ID defined for each of the EC companies.

The vehicle-specific information may be any information as long as the information is able to specify the vehicle 10A that is a target of locking, unlocking, or activation using the authentication key. For example, the vehicle-specific information may be identification information such as a vehicle ID or a vehicle identification number (VIN), which is defined for each vehicle 10A. For example, the vehicle-specific information may be identification information such as a key unit ID, which is defined for each in-vehicle device related to locking, unlocking, or activation of the doors based on the authentication key mounted on the vehicle 10A such as the key unit 12. Hereinafter, description will be given on the premise that the vehicle-specific information is the key unit ID.

The service link information is information needed for the key sharing management unit 3207, the delivery management server 50, the EC server 60, and the C2C car sharing management server 70 managing various services to transmit the authentication key arrangement request to thereby cause the authentication key issuance unit 3203 to issue the authentication key and distribute the authentication key to the mobile terminal 20 that is a target. That is, the authentication key issuance unit 3203 can specify the vehicle 10A that is a target of locking, unlocking, or activation using the authentication key and issue an appropriate authentication key by receiving the authentication key arrangement request including the service link information from the key sharing management unit 3207, the delivery management server 50, the EC server 60, and the C2C car sharing management server 70.

The service link information may be any information as long as the target service is associated with the vehicle 10A and the user who uses the service in the center server 30. For example, the service link information may be a login ID of the regular user at a website for users of various services corresponding to the key sharing management unit 3207, the delivery management server 50, the EC server 60, and the C2C car sharing management server 70 (hereinafter referred to as "service login ID" for convenience). In the above-described case, the service use registration request unit 237 of the mobile terminal 20Aa transmits the service use registration request including the service login ID of the regular user that is a registration target corresponding to the various services to the center server 30 via the communication processing unit 232. When the regular user that is a registration target corresponding to various services does not acquire the service login ID, the processing device 23 of the mobile terminal 20Aa may activate a predetermined browser and acquire the service login ID of a website of various services. Accordingly, when the user (the regular user of the vehicle 10A) logs in to the website at the time of requesting a service that is a target, the delivery management server 50 or the C2C car sharing management server 70 can recognize the service login ID corresponding to the service link information and easily arrange the authentication key regarding the service provision. Hereinafter, description will be given on the premise that the service link information on the trunk delivery service and the C2C car sharing service is the service login ID.

In the case of regular users who regularly use a plurality of vehicles 10A, the center server 30 can specify the regular user solely by using the service login ID, but cannot specify the vehicle 10A. Therefore, information for indirectly specifying the vehicle 10A (for example, information obtained by encrypting the vehicle-specific information using a predetermined scheme) in addition to the service login ID may be included in the service link information.

When the registration of use of various services has been completed, registration management unit 3206 notifies the mobile terminals 20Aa and 20Ab corresponding to the regular users that are registration targets that the registration of use of various services has been completed, via communication processing unit 3201. When the registration of use of various services has been completed, the registration management unit 3206 transmits a service use registration completion notification including the service link information to the key sharing management unit 3207 or the service management server 40 that performs an operation and management of a service that is a registration target.

A notification that the registration of use of various services for the mobile terminals 20Aa and 20Ab has been completed may be transmitted from the service management server 40 that has received the service use registration completion notification.

When the service use situation request has been received from the mobile terminal 20Aa by the communication processing unit 3201, the registration management unit 3206 generates the service use situation information based on, for example, the vehicle use schedule information managed by the user service registration information DB of the storage unit 520 or the schedule management unit 3205, and distributes the service use situation information to the mobile terminal 20Aa via the communication processing unit 3201.

The key sharing management unit 3207 performs an operation and management of the key sharing service.

For example, according to the key sharing request received from the mobile terminal 20Aa of the owner user by the communication processing unit 3201, the key sharing management unit 3207 performs the arrangement of the authentication key to the mobile terminals 20Aa and 20Ab corresponding to the regular user ID designated by the key sharing request. Specifically, the key sharing management unit 3207 collates the owner user ID and the password included in the key sharing request with the owner user ID and the password stored in the storage unit 3200, and determines that the key sharing request is a regular key sharing request when both match. The key sharing management unit 3207 inquires of the schedule management unit 3205 and determines whether or not there is mismatch, that is, overlapping of the use date and time regarding the use of the services and the vehicle 10A of the regular users between the use period information included in the key sharing request and the latest vehicle use schedule information. When there is no overlapping of the use time, the key sharing management unit 3207 sends, to the authentication key issuance unit 3203, the authentication key arrangement request including information on the regular users corresponding to the mobile terminals 20Aa and 20Ab that are distribution targets of the authentication key specified by the information included in the key sharing request, and the vehicle 10A that is a target of locking, unlocking, or activation using the authentication key, and authority information such as a period of time in which the authentication key is available to the respective mobile terminals 20Aa and 20Ab, the number of times the authentication key is available to the respective mobile terminals 20Aa and 20Ab, unlockable doors, and whether or not the vehicle can be activated. Accordingly, the authentication key issuance unit 3203 can specify the regular user IDs corresponding to the mobile terminals 20Aa and 20Ab that are distribution targets of the authentication key, and the vehicle 10A that is a target of locking, unlocking, or activation using the authentication key, and issue an appropriate authentication key.

For example, the key sharing management unit 3207 confirms, for example, attribute information (for example, an age or presence or absence of a driving license) of the users of the mobile terminals 20Aa and 20Ab that are distribution targets of the authentication key that is designated by the key sharing request, which is stored in the storage unit 3200. When the users of the mobile terminal 20Aa and 20Ab (regular users of the vehicle 10A) that are distribution targets of the authentication key are users determined to be unable to drive the vehicle 10A, the key sharing management unit 3207 allows an authentication key to which an authority to be unable to activate the vehicle 10A has been imparted to be issued to the mobile terminal 20 of the user. The user who cannot drive the vehicle 10A is, for example, a user who has not reached an age at which the user can acquire a driver's license or a user who does not acquire the driver's license. Specifically, the key sharing management unit 3207 sends an authentication key arrangement request in which an indication that the activation of the vehicle 10A is prohibited is included in authority information corresponding to the mobile terminals 20Aa and 20Ab corresponding to the users determined to be unable to drive the vehicle 10A, to the authentication key issuance unit 3203. Accordingly, since the authentication key issuance unit 3203 can distribute the authentication key to which the authority to prohibit the activation of the vehicle 10A has been imparted, to the mobile terminals 20Aa and 20Ab of the users who are unable to drive the vehicle 10A, it is possible to improve safety of the vehicle 10A in the key sharing service.

For example, the key sharing management unit 3207 distributes the authentication key of the vehicle 10A to the other mobile terminal 20 designated by the temporary key sharing request received from the mobile terminal 20Aa of the owner user by the communication processing unit 3201 based on the temporary key sharing request. Specifically, the key sharing management unit 3207 specifies the ID of the installing user corresponding to the other mobile terminal 20 that is a distribution target (hereinafter referred to as "installing user ID") based on the installing user information DB of the key application stored in the storage unit 3200. The key sharing management unit 3207 sends an authentication key arrangement request including the specified installing user ID and information (for example, an issued ID of the authentication key included in the temporary key sharing request) corresponding to the authentication key designated by the temporary key sharing request to the authentication key issuance unit 3203. Accordingly, the authentication key issuance unit 3203 can specify another mobile terminal 20 that is a distribution target based on the installing user ID, the issued ID of the authentication key, and the like, and distribute the authentication key to the other mobile terminal 20 via the communication processing unit 3201.

A function of the key sharing management unit 3207 may be transferred to a server (a key sharing management server) outside the center server 30, which may be included in the service management server 40, similar to other services for using the vehicle 10A.

The mobile terminal 20Ab carried by the sub-user includes the communication processing unit 231, the communication processing unit 232, the authentication key acquisition unit 233, the authentication request unit 234, the locking and unlocking request unit 235, and the storage unit 230, as described above.

In the embodiment, description will be given on the premise that the function of the authentication key acquisition unit 233 of the mobile terminal 20Ab is available to the sub-user by the key application being activated and the user authentication based on bidirectional communication with the center server 30 being successful. Description will be given on the premise that the user authentication is performed by the center server 30 based on the sub-user ID and the password. Description will be given on the premise that functions of the authentication request unit 234 and the locking and unlocking request unit 235 of the mobile terminal 20Ab are available to the sub-user by the key application being activated.

The authentication key acquisition unit 233 acquires the authentication key distributed from the center server 30 according to the key sharing request transmitted from the mobile terminal 20Aa to the center server 30 via the communication processing unit 232, as described above. Accordingly, the mobile terminal 20Ab can lock and unlock the doors of the vehicle 10A or activate the vehicle 10A based on the functions of the communication processing unit 231, the authentication request unit 234, and the locking and unlocking request unit 235. That is, the sub-user carrying the mobile terminal 20Ab can directly use the vehicle 10A through the key sharing service. For example, the sub-user can lock and unlock the vehicle 10A using the mobile terminal 20Ab without performing key exchange with the owner user and drive the vehicle 10A. Similarly, the owner user can lend the vehicle 10A to the sub-user without exchanging the key with the sub-user. Accordingly, it is possible to improve convenience in lending and borrowing of the vehicle 10A between the owner user of the vehicle 10A and the sub-user through the key sharing service in the authentication key management system 1.

The authentication key acquisition unit 233 acquires the authentication key that is distributed from the center server 30 according to the temporary key sharing request transmitted from the mobile terminal 20Aa to the center server 30 via the communication processing unit 232, as described above. The same applies to a case where the authentication key is distributed to another mobile terminal 20 other than the mobile terminal 20Ab of the sub-user according to the temporary key sharing request. Accordingly, the other mobile terminal 20 including the mobile terminal 20Ab can lock and unlock the doors of the vehicle 10A or activate the vehicle 10A based on the functions of the communication processing unit 231, the authentication request unit 234, and the locking and unlocking request unit 235. That is, for example, when a plurality of persons including other regular users get on the vehicle 10A together and go out and even when the sub-user carrying the mobile terminal 20Ab does not acquire the authentication key in advance, the sub-user does not have to borrow the mobile terminals 20Aa and 20Ab to which the authentication key has already been distributed, and can directly use the vehicle 10A using the mobile terminal 20Ab, such as locking and unlocking the vehicle 10A or driving the vehicle 10A. Similarly, even when the owner user has not caused the mobile terminal 20Ab of the sub-user to acquire the authentication key, it is not needed for the owner user to lend the mobile terminal 20Aa of the owner user to the sub-user. Accordingly, it is possible to improve convenience of the user in a case where a plurality of persons including the regular user of the vehicle 10A gets on the vehicle 10A together and uses the vehicle 10A through the temporary key sharing in the authentication key management system 1.

Details of Configuration Regarding Trunk Delivery Service

A configuration regarding the trunk delivery service in the authentication key management system 1 will be described with reference to FIG. 4.

Figure 4:
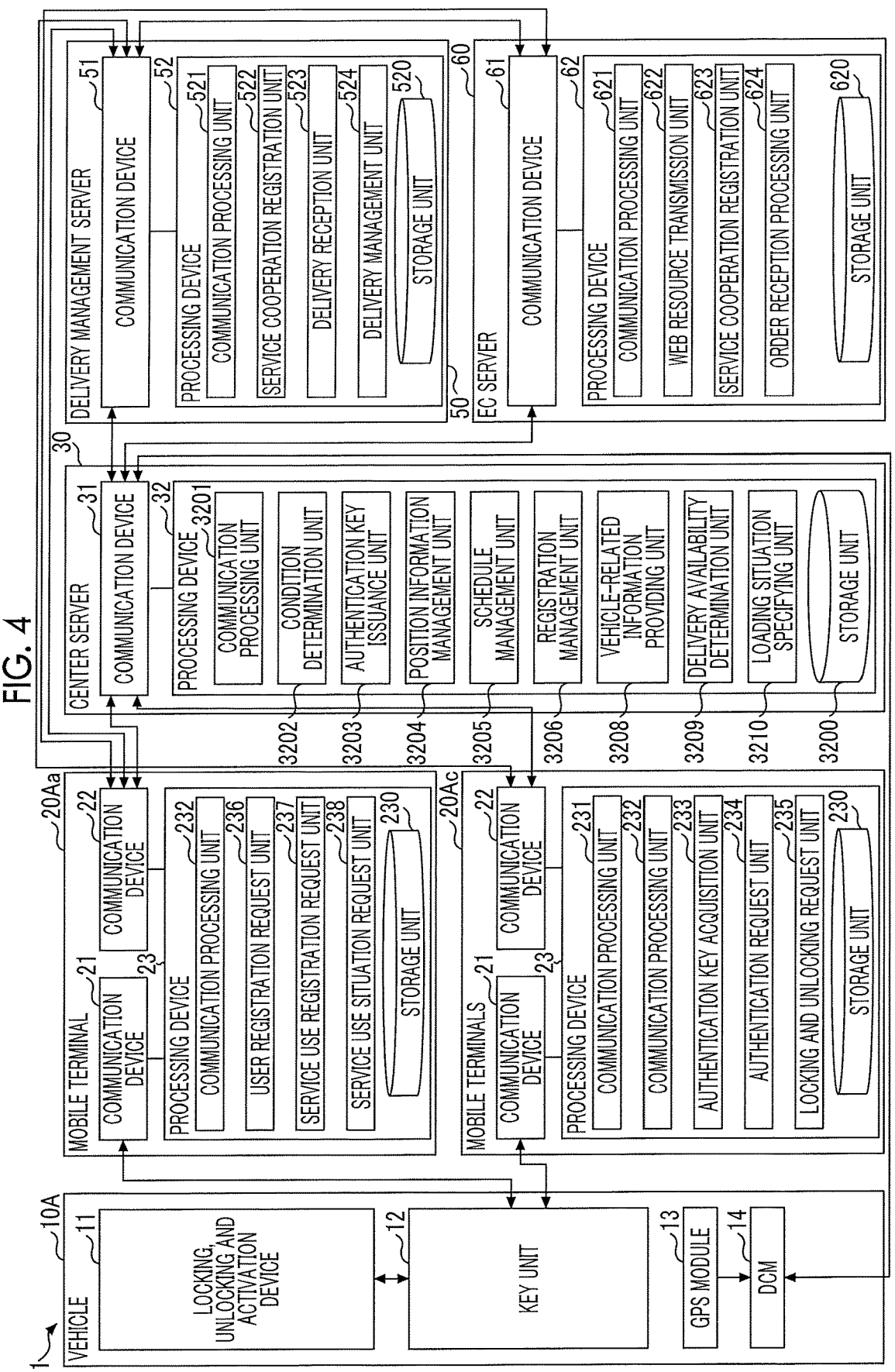
FIG. 4 is a diagram mainly illustrating an example of a configuration regarding a trunk delivery service in the authentication key management system.

FIG. 4 is a diagram mainly illustrating an example of a configuration regarding a trunk delivery service in the authentication key management system 1. Hereinafter, the configuration regarding the trunk delivery service in the authentication key management system 1 will be mainly described with reference to FIG. 4, and duplicate description on the configuration overlapping the above-described configuration regarding the key sharing service will be omitted as much as possible.

The processing device 23 of the mobile terminal 20Aa carried by the owner user of the vehicle 10A includes the communication processing unit 232, the user registration request unit 236, the service use registration request unit 237, and the service use situation request unit 238, as described above.

The user registration request unit 236 requests the center server 30 to register the regular user (a sub-user) of the vehicle 10A who uses various services including the trunk delivery service according to a predetermined manipulation by the owner user, as described above.

The service use registration request unit 237 requests the center server 30 to perform the registration of use of various services including the trunk delivery service for each registered regular user (the owner user or the sub-user) according to a predetermined manipulation by the owner user, as described above.

For example, the service use registration request unit 237 transmits, as the service link information, a service use registration request for using the trunk delivery service including a service login ID of a website for a user who uses the service of the delivery management server 50 (hereinafter referred to as a "delivery site") and a service login ID of the EC site, which corresponds to the regular user of the vehicle 10A that is a registration target, to the center server 30.

The service use situation request unit 238 requests the center server 30 to provide information on a use situation of various services (service use situation information) including the trunk delivery service of the regular user of the vehicle 10A for which the use registration has been performed, in a form corresponding to the owner user ID according to a predetermined manipulation by the owner user, as described above.

The delivery management server 50 includes a communication device 51 and a processing device 52.

The communication device 51 is any device that performs bidirectional communication with each of the mobile terminal 20, the center server 30, and the EC server 60 over a predetermined communication network.

The processing device 52 includes, for example, a communication processing unit 521, a service cooperation registration unit 522, a delivery reception unit 523, and a delivery management unit 524 as functional units that are realized by executing one or more programs stored in the ROM or the auxiliary storage device on the CPU.

The processing device 52 includes a storage unit 520 that is realized as a storage area of an auxiliary storage device or the like of the server computer.

The communication processing unit 521 controls the communication device 51 to perform transmission and reception of various signals such as control signals or information signals to and from each of the mobile terminal 20, the center server 30, and the EC server 60.

The service cooperation registration unit 522 performs information registration for cooperation between the center server 30 regarding the use of the trunk delivery service of the regular user of the vehicle 10A and the delivery management server 50 according to the service use registration completion notification received from the center server 30 by the communication processing unit 521.

For example, the service cooperation registration unit 522 adds a flag indicating a use target of the trunk delivery service to the service login ID (service link information) included in the service use registration completion notification in the user management DB that manages the user of the delivery site constructed in the storage unit 520. In addition, the service cooperation registration unit 522 performs registration in an aspect in which a service login ID of a website (that is, the EC site) corresponding to the EC server 60 included in the service use registration completion notification is linked to the service login ID included in the service use registration completion notification in the user management DB of the storage unit 520. Accordingly, when an order reception including a service login ID is received from the EC server 60 by the communication processing unit 521, the delivery management server 50 can specify the corresponding service login ID of the delivery site. The delivery management server 50 transmits the authentication key arrangement request including the specified service login ID to the center server 30 such that it is possible to cause the authentication key to be distributed from the center server 30 to the mobile terminal 20Ac of the deliverer, as described below.

The delivery reception unit 523 receives information (delivery request information) on the luggage delivery request including the service login ID of the EC site corresponding to an orderer of the product at the EC site from the EC server 60 via the communication processing unit 521. The delivery request information received from the EC server 60 includes information on a designated delivery destination (delivery destination information), information on a designated delivery date and time (delivery date and time information), and the like in addition to basic information such as a name, an address, and a telephone number of the orderer that is a delivery destination.

The delivery management unit 524 performs an operation and management of each process from reception to delivery regarding the delivery request received by the delivery reception unit 523.

For example, when the delivery management unit 524 receives a notification that a luggage has reached a business office that has jurisdiction over a parking position of the vehicle 10A designated by the delivery destination information of the delivery request, the delivery management unit 524 determines a date and time of departure for delivery of the luggage, a deliverer in charge, and the like according to a designated delivery time period.

The delivery management unit 524 inquires the center server 30 about the position information of the vehicle 10A via the communication processing unit 521 before departure of the luggage (for example, 10 minutes before a departure scheduled time). When the delivery management unit 524 inquires the center server 30 about the position information of the vehicle 10A, a service login ID (that is, service link information) at a delivery site of the regular user of the vehicle 10A that is a user of the trunk delivery service is included in the inquiry. The same also applies to an inquiry about position information to be described below. The delivery management unit 524 acquires current position information of the vehicle 10A from the center server 30 via the communication processing unit 521 and determines whether or not the delivery can be performed from matching with the parking position of the designated vehicle 10A and a relationship with a jurisdiction area.

When the delivery management unit 524 determines that the delivery can be performed, the delivery management unit 524 transmits a notification that the luggage can be delivered to the trunk of the vehicle 10A (delivery available notification) to the mobile terminal 20Ac of the deliverer via the communication processing unit 521.

When an authentication key acquisition request is received from the mobile terminal 20Ac that has received the delivery available notification by the communication processing unit 521, the delivery management unit 524 determines whether or not the authentication key acquisition request is a regular authentication key acquisition request. Specifically, the delivery management unit 524 may perform the determination by collating information on a luggage that is a delivery target (hereinafter referred to as "delivery luggage information" for convenience) such as a deliverer, a destination (for example, a name of a recipient or a corporate name), a type of luggage, a delivery time period, and a delivery place that can be included in the authentication key acquisition request, with various types of information on the luggage registered in the storage unit 520. When the delivery management unit 524 determines that the authentication key acquisition request is a regular authentication key acquisition request, the delivery management unit 524 transmits an authentication key arrangement request to the center server 30 via the communication processing unit 521. When the delivery management unit 524 transmits the authentication key arrangement request to the center server 30, information for specifying the mobile terminal 20Ac of the deliverer may be included in the authentication key arrangement request. The information for specifying the deliverer may be, for example, an authentication ID for obtaining user authentication at the center server 30 in order for the deliverer to use the function of the key application corresponding to the authentication key acquisition unit 233 of the mobile terminal 20Ac or the like (hereinafter referred to as a "deliverer ID" for convenience). Accordingly, the mobile terminal 20Ac of the deliverer can acquire the authentication key from the center server 30.

When the delivery management unit 524 receives an inquiry about the current position of the vehicle 10A from the mobile terminal 20Ac of the deliverer who has left for the delivery from the business office via the communication processing unit 521, the delivery management unit 524 inquires of the center server 30 about the current position information of the vehicle 10A. The delivery management unit 524 acquires the current position information of the vehicle 10A from the center server 30 via the communication processing unit 521 and transmits (transfers) the current position information of the vehicle 10A to the mobile terminal 20Ac of the deliverer. Accordingly, the deliverer who has gone out can compare the current position information of the vehicle 10A with the information on the parking position of the vehicle 10A designated by the delivery destination information and determine whether to deliver the luggage or return to the business office.

When the delivery management unit 524 receives the delivery completion notification received from the mobile terminal 20Ac of the deliverer who has completed the delivery of the luggage via the communication processing unit 521, an operation and management regarding the trunk delivery service regarding the luggage basically ends. When the operation and management regarding the trunk delivery service regarding the luggage ends, the delivery management unit 524 may notify delivery to the regular user of the vehicle 10A that is a client (a purchaser of a product at the EC site) through an electronic mail or a predetermined application cooperating with the delivery site installed in the mobile terminals 20Aa and 20Ab has been completed. When the regular user of the vehicle 10A is notified that the delivery has been completed, the delivery completion notification transmitted from the mobile terminal 20Ac of the deliverer may include the captured image (hereinafter referred to as an "image at the time of delivery completion") of the trunk of the vehicle 10A in which the luggage is accommodated, which the deliverer has acquired using a camera function of the mobile terminal 20Ac at the time of delivery completion. Accordingly, the delivery management unit 524 can reliably confirm that the luggage has been accommodated in the trunk of the vehicle 10A through a known image recognition process or the like, and then, end the operation and management regarding the trunk delivery service relating to the luggage.

The DCM 14 of the vehicle 10A may determine that the delivery by the deliverer has been completed when the door (the trunk lid or the like) for access to the trunk of the vehicle 10A is locked after the door is unlocked, and notify the center server 30 that the delivery by the deliverer has been completed, as described above. Accordingly, the center server 30 can transmit a delivery completion notification to the delivery management server 50 when the notification is received. That is, the delivery completion notification may be transmitted from the center server 30 to the delivery management server 50.

The EC server 60 includes a communication device 61 and a processing device 62.

The communication device 61 is any device that performs bidirectional communication with each of the mobile terminal 20, the center server 30, and the delivery management server 50 over a predetermined communication network.

The processing device 62 includes, for example, a communication processing unit 621, a web resource transmission unit 622, a service cooperation registration unit 623, and an order reception processing unit 624 as functional units that are realized by executing one or more programs stored in the ROM or the auxiliary storage device on the CPU. The processing device 62 includes a storage unit 620 that is realized as a storage area of an auxiliary storage device or the like of the server computer.

The communication processing unit 621 controls the communication device 61 to perform transmission and reception of various signals such as control signals or information signals to and from each of the mobile terminal 20, the center server 30, and the delivery management server 50.

The web resource transmission unit 622 transmits resources corresponding to the web page to be displayed on a browser of any terminal of the user browsing the EC site including the mobile terminals 20Aa and 20Ab based on various types of information as resources of the EC site stored in the storage unit 620 to the browser of the terminal using a predetermined scheme. A top page of the EC site, a product page corresponding to an individual product handled at the EC site, an order information input page for the user to input various types of information (for example, an address, a name, a payment method, a delivery company, or a delivery destination) at the time of ordering an individual product, and the like are included in the web page on the EC site. For example, the web resource transmission unit 622 transmits a Hyper Text Markup Language (HTML) document corresponding to web page, and information under the HTML document such as an image and a moving image displayed on web pages in parallel.

For example, under the control of the center server 30, the web resource transmission unit 622 causes information on the vehicle 10A for the user designating the trunk of the vehicle 10A as a delivery destination of the product (hereinafter referred to as "vehicle-related information") to be displayed in the order information input page. Details of the vehicle-related information and details of a method of displaying the vehicle-related information will be described below.

The service cooperation registration unit 623 performs information registration for cooperation between the center server 30 regarding the use of the trunk delivery service of the regular user of the vehicle 10A and the EC server 60 according to the service use registration completion notification received from the center server 30 by the communication processing unit 621. For example, the service cooperation registration unit 623 adds a flag indicating a use target of the trunk delivery service to the service login ID included in the service use registration completion notification in the user management DB that manages the user of the EC site constructed in the storage unit 620. In addition, the service cooperation registration unit 623 performs registration in an aspect in which a service login ID of a website (that is, the delivery site) corresponding to the delivery management server 50 included in the service use registration completion notification is linked to the service login ID included in the service use registration completion notification in the user management DB. Accordingly, for example, when an inquiry about an ordered product including the service login ID of the delivery site is received from the delivery management server 50 by the communication processing unit 621, the EC server 60 can specify the service login ID of the corresponding EC site.

The order reception processing unit 624 receives an order of products from the user based on various manipulation inputs corresponding to the order of the product of the user at the EC site. When the order reception processing unit 624 receives an order and the trunk of the vehicle 10A is selected as a delivery destination on an order input page of the EC site, the order reception processing unit 624 inquires the center server 30 about the car use schedule information via the communication processing unit 621.

Accordingly, the order reception processing unit 624 can acquire the latest vehicle use schedule information via the communication processing unit 621. Therefore, for example, when a designated date and time of delivery has already overlapped another schedule, the order reception processing unit 624 can take countermeasures such as requesting to change a delivery date and time.

As described above, the trunk delivery service in which a luggage other than an ordered product at the EC site is a target can also be assumed. In the above-described case, the delivery management server 50 may similarly acquire the latest vehicle use schedule information from the center server 30. Accordingly, the delivery management server 50 can take countermeasures such as requesting to change a delivery date and time when a date and time of delivery of the luggage to the trunk of the vehicle 10A designated by the regular user of the vehicle 10A has already overlapped another schedule.

The processing device 32 of the center server 30 includes the communication processing unit 3201, the condition determination unit 3202, the authentication key issuance unit 3203, the position information management unit 3204, the schedule management unit 3205, the registration management unit 3206, and the storage unit 3200, as described above. The processing device 32 further includes a vehicle-related information providing unit 3208, a delivery availability determination unit 3209, and a loading situation specifying unit 3210 as functional units realized by executing one or more programs stored in the ROM of the server computer or the auxiliary storage device on the CPU.

When the condition determination unit 3202 receives the authentication key arrangement request from the delivery management server 50 via the communication processing unit 3201, the condition determination unit 3202 determines whether or not the authentication key arrangement request is a regular authentication key arrangement request. For example, the condition determination unit 3202 determines whether or not the authentication key arrangement request is the regular authentication key arrangement request based on the service login ID of the delivery site included in the authentication key arrangement request or predetermined authentication information (for example, the ID and the password) corresponding to the delivery management server 50.

When the condition determination unit 3202 determines whether or not the authentication key arrangement request is a regular authentication key arrangement request, the authentication key issuance unit 3203 specifies the vehicle 10A corresponding to the authentication key arrangement request based on the user service registration information DB of the storage unit 3200. The authentication key issuance unit 3203 issues the authentication key in which a time is limited (for example, the vehicle is available solely in units of several minutes to tens of minutes from the distribution), the number of times of use is limited (for example, the number of times of use is solely 1), and an authority is limited so that solely locking and unlocking of the trunk lid can be allowed. Accordingly, it is possible to suppress unauthorized use of the vehicle 10A by the deliverer and to improve security. The authentication key issuance unit 3203 distributes the authentication key to the mobile terminal 20Ac of the deliverer specified by the authentication key arrangement request via the communication processing unit 3201.

For example, any method such as a known mathematical method or a method based on bidirectional communication between the center server 30 and the vehicle 10 may be adopted as a method of limiting a period of time in which the authentication key is available or the number of times the authentication key is used.

The position information management unit 3204 transmits a position information request to the vehicle 10A via the communication processing unit 3201 according to the inquiry about the current position of the vehicle 10A from the delivery management server 50 received by the communication processing unit 3201. Accordingly, the DCM 14 of the vehicle 10A can reply the center server 30 with the position information of the vehicle 10A input from the GPS module 13 according to the position information request from the center server 30, and the position information management unit 3204 can acquire the current position information from the vehicle 10A via the communication processing unit 3201. The position information management unit 3204 replies the delivery management server 50 with the current position information acquired from the vehicle 10A via the communication processing unit 3201.

The schedule management unit 3205 replies the EC server 60 with the latest vehicle use schedule information stored in the storage unit 3200 via the communication processing unit 3201 according to the inquiry from the EC server 60 received by the communication processing unit 3201.

The registration management unit 3206 performs registration of the regular user (the sub-user) who uses various services including the trunk delivery service according to the user registration request received from the mobile terminal 20Aa of the owner user by the communication processing unit 3201, as described above. The registration management unit 3206 performs registration of use of the trunk delivery service by the regular user of the vehicle 10A according to the service use registration request received from the mobile terminal 20Aa of the owner user by the communication processing unit 3201, as described above. When the registration of use of various services including the trunk delivery service has been completed, the registration management unit 3206 notifies the mobile terminals 20Aa and 20Ab corresponding to the regular users that are registration targets that the registration of use of various services including the trunk delivery service has been completed via the communication processing unit 3201, as described above. When the registration of use of the trunk delivery service has been completed, the registration management unit 3206 transmits a service use registration completion notification including the service link information to the delivery management server 50 and the EC server 60 that perform an operation and management of a service that is a registration target via the communication processing unit 3201.

The vehicle-related information providing unit 3208 (an example of a display controller) provides the vehicle-related information for designating the trunk of the vehicle 10A as the delivery destination of the product to a user (specifically, the regular user of the vehicle 10A) on the order information input page of the EC site. That is, the vehicle-related information providing unit 3208 causes the vehicle-related information for the user to designate the trunk of the vehicle 10A as the delivery destination of the product to be displayed on the order information input page of the EC site browsed by the user. In this case, the vehicle-related information providing unit 3208, for example, can specifically specify that the user is the regular user of the vehicle 10A based on the service login ID of the user browsing the order input page included in the information input from the EC site (the EC server 60).

The vehicle-related information includes, for example, information on a use situation according to various services of the vehicle 10A, that is, vehicle use schedule information that is sequentially updated by the schedule management unit 3205. Thus, when the user designates the trunk of the vehicle 10A as the delivery destination of the product, the user can designate a scheduled delivery date and time from among idle time.

The vehicle-related information may include, for example, position information of a place at which the vehicle 10A is parked. In this case, the position information at which the vehicle 10A is parked may be acquired by the position information management unit 3204. Thus, the user can recognize whether or not the trunk of the vehicle 10A can be designated as the delivery destination of the product according to whether or not the vehicle 10A is within the deliverable area.

The vehicle-related information may include, for example, information on a situation of the delivery of the luggage to the trunk of the vehicle 10A (for example, a history of luggage delivered to the trunk for the last few days). In this case, the information on the situation of the delivery of the luggage to the trunk of the vehicle 10A may be acquired by the center server 30 by inquiring of the delivery management server 50 via the communication processing unit 3201, for example. Thus, the user can recognize, for example, whether or not already delivered luggage is left in the trunk of the vehicle 10A and determine whether or not the trunk of the vehicle 10A can be designated as the delivery destination of the product.

The vehicle-related information includes, for example, information on a situation of a request of luggage to the trunk of the vehicle 10A (for example, information on the number of luggage for which the trunk of the vehicle 10A has been already requested as the delivery destination, or information on individually requested luggage). The information on the situation of the request of the luggage to the trunk of the vehicle 10A may be acquired by the center server 30 by inquiring of the delivery management server 50 via the communication processing unit 3201, for example. Thus, the user can determine, for example, whether or not the trunk of the vehicle 10A can be designated as the delivery destination of the product in consideration of the number of already requested luggage or the like.

When the number of products to be ordered this time, other luggage already scheduled to be delivered, or the like is relatively large, the vehicle-related information providing unit 3208 can simply cause a warning that the delivery is not available due to the trunk of the vehicle 10A being full, to be displayed on the order information input page of the EC site. When the number of products to be ordered this time, other luggage already scheduled to be delivered, or the like is relatively large, the vehicle-related information providing unit 3208 may prevent the user from selecting the trunk of the vehicle 10A as the delivery destination of the product on the order information input page of the EC site. Specifically, when the number of products that the user tries to order at the EC site exceeds a predetermined threshold value, the vehicle-related information providing unit 3208 may cause the warning to be displayed on the order information input page of the EC site or may prevent the user from selecting the trunk of the vehicle 10A as the delivery destination of the products. When the number of cases of delivery requests or the amount of delivery (delivery capacity) of luggage for which the trunk of the vehicle 10A is designated as the delivery destination has already exceeded a predetermined threshold value, the vehicle-related information providing unit 3208 may cause the warning to be displayed on the order information input page of the EC site or prevent the user from selecting the trunk of the vehicle 10A as the delivery destination of the products. In this case, the delivery request of the luggage for which the trunk of the vehicle 10A is designated as the delivery destination includes delivery requests of all the luggage by all the regular users of the vehicle 10A. A unit of the amount of delivery may be defined based on a size of the luggage which becomes a reference of a charge at the time of request of the luggage (for example, a size defined according to a total value of three sides when the luggage is assumed to be rectangular) or the like. Accordingly, the center server 30 can cause a warning to be displayed on the order information input page of the EC site based on a simple determination condition in a situation in which the delivery is likely not to available, and to prompt delivery of the product to a place other than the trunk of the vehicle.

The vehicle-related information includes, for example, information regarding whether or not the delivery of the product to the trunk of the vehicle 10A is available (hereinafter referred to as "delivery availability information"), which is determined based on various situations of the vehicle 10A. The delivery availability information corresponds to a determination result of the delivery availability determination unit 3209 to be described below. In this case, when the delivery availability information indicates that the delivery is available, the vehicle-related information providing unit 3208 may allow the user to select the trunk of the vehicle 10A as the delivery destination of the product on the order information input page of the EC site. That is, the vehicle-related information providing unit 3208 may prevent the user from selecting the trunk of the vehicle 10A as the delivery destination of the product on the order information input page of the EC site when the delivery availability information indicates that delivery is not available. Accordingly, when the center server 30 determines that the product cannot be delivered to the trunk of the vehicle 10A, it is possible to prevent the trunk of the vehicle 10A from being designated as the delivery destination of the product. In this case, when the delivery availability information indicates that the delivery is not available, the vehicle-related information providing unit 3208 causes a display to be performed so that the user cannot select an option of the trunk of the vehicle 10A on the order information input page of the EC site (for example, a button icon for selecting the trunk of the vehicle 10A as the delivery destination of a product is displayed in a state in which a click manipulation or a tap manipulation for the button icon cannot be performed). When the delivery availability information indicates that the delivery is not available, the vehicle-related information providing unit 3208 may cause an indication that the product cannot be delivered to the trunk of the vehicle 10A to be displayed on the order information input page of the EC site. Accordingly, although the center server 30 can cause the user to recognize a situation in which the product cannot be delivered to the trunk of the vehicle for some reason despite the fact that the trunk of the vehicle 10A can normally be designated as the delivery destination.

In a case where the delivery availability information is not included in the vehicle-related information provided to the user at the EC site by the vehicle-related information providing unit 3208, the delivery availability determination unit 3209 or the loading situation specifying unit 3210 to be described below may be omitted.

Hereinafter, a specific operation of the vehicle-related information providing unit 3208 will be described below (see FIGS. 7 to 10).

The delivery availability determination unit 3209 determines whether or not a product that the user (the regular user of the vehicle 10A) tries to order at the EC site can be delivered to the trunk of the vehicle 10A.

For example, the delivery availability determination unit 3209 determines whether or not the delivery of the product to the trunk of the vehicle 10A is available, based on position information of a place at which the vehicle 10A is parked. Specifically, the delivery availability determination unit 3209 determines whether or not the delivery of the product to the trunk of the vehicle 10A is available based on whether or not the position information of the place at which the vehicle 10A is parked is within the deliverable area in the trunk delivery service.

For example, the delivery availability determination unit 3209 determines whether or not the delivery of the product to the trunk of the vehicle 10A is available based on the vehicle type information of the vehicle 10A. This is because a size of the trunk of the vehicle 10A varies according to a vehicle type, and a capacity of accommodable luggage may vary. In this case, the delivery availability determination unit 3209 can use, for example, the vehicle type information of the vehicle 10A registered as supplemental information in a user and service registration DB of the storage unit 3200.

For example, the delivery availability determination unit 3209 determines whether or not the delivery of the product to the trunk of the vehicle is available based on a type of the product that the user tries to order at the EC site. Specifically, when a product that the user tries to order is food, a situation in which the trunk of the vehicle 10A becomes at a high temperature under hot weather in the summer or falls below a freezing point in the winter is supposed, and therefore, the delivery availability determination unit 3209 may determine that the product cannot be delivered to the trunk of the vehicle 10A in a specific period of time such as summer or winter. When a product that the user tries to order is a long product such as a ski or surfboard, the product is highly likely not to be accommodated in the trunk of the vehicle 10A, the delivery availability determination unit 3209 may determine that the product cannot be delivered to the trunk of the vehicle 10A according to a vehicle type of the vehicle 10A (a size of the trunk) or the like. When a product that the user tries to order is a product needing refrigeration or a product needing freezing, the delivery availability determination unit 3209 may determine whether or not the delivery of the product to the trunk of the vehicle 10A is available based on whether or not a cold storage facility or a cold storage product (for example, a cooler box) is present in the trunk of the vehicle 10A. In this case, the delivery availability determination unit 3209 can use information on whether or not there is the cold storage facility or there is the cold storage product of the trunk of the vehicle 10A, which can be registered as supplemental information in the user and service registration DB of the storage unit 3200. The delivery availability determination unit 3209 may acquire the latest image regarding the vehicle 10A at the time of delivery completion from the delivery management server 50 by inquiring of the delivery management server 50 via the communication processing unit 3201 and determine, for example, whether or not there is the cold storage facility or there is the cold storage product of the trunk of the vehicle 10A from the image at the time of delivery completion.

For example, the delivery availability determination unit 3209 determines whether or not the delivery of the product to the trunk of the vehicle 10A is available based on the loading situation of the trunk of the vehicle 10A, which is specified by the loading situation specifying unit 3210 to be described below. Specifically, when a current loading situation (loading capacity) of the trunk of the vehicle 10A specified by the loading situation specifying unit 3210 exceeds a predetermined reference, the delivery availability determination unit 3209 determines that the delivery of the product to the trunk of the vehicle 10A is not available. When the loading situation (predicted loading capacity) of the trunk of the vehicle 10A specified by the loading situation specifying unit 3210 at the time of product delivery exceeds the predetermined reference, the delivery availability determination unit 3209 determines that the delivery of the product to the trunk of the vehicle 10A is not available. The delivery availability determination unit 3209 may determine whether or not the delivery is available by determining whether or not the products can be accommodated in the trunk of the vehicle 10A in consideration of a size, shape, or the like of a product that the user tries to order in a loading situation of the trunk of the vehicle 10A at the time of product delivery specified by the loading situation specifying unit 3210.

The delivery availability determination unit 3209 may be provided, for example, in the delivery management server 50. In the above case, the vehicle-related information providing unit 3208 can acquire delivery availability information from the delivery management server 50 by inquiring of the delivery management server 50 via the communication processing unit 3201.

The loading situation specifying unit 3210 specifies the loading situation of the trunk of the vehicle 10A.

For example, the loading situation specifying unit 3210 specifies the current (the time of an order request) loading situation of the trunk of the vehicle 10A.

Specifically, the loading situation specifying unit 3210 may specify the current loading situation of the trunk of the vehicle 10A based on the situation of delivery of the luggage to the trunk of the vehicle 10A and the situation of reception of the luggage from the trunk of the vehicle 10A. More specifically, the loading situation specifying unit 3210 may specify the current loading situation (loading capacity) of the trunk of the vehicle 10A by specifying remaining luggage not received despite the luggage having been delivered to the trunk of the vehicle 10A. The loading situation specifying unit 3210 may acquire an image at the time of delivery completion from the delivery management server 50 by inquiring of the delivery management server 50 via the communication processing unit 3201 (an example of an image acquisition unit), and specify the current loading situation (loading capacity) of the trunk of the vehicle 10A from the image at the time of the delivery completion.

For example, the loading situation specifying unit 3210 may specify (estimate) the loading situation of the trunk of the vehicle 10A at the time of delivery of the product. More specifically, the loading situation specifying unit 3210 may specify the loading situation of the trunk of the vehicle 10A at the time of delivery of the product in consideration of a request situation of the luggage for which the trunk of the vehicle 10A is designated as the delivery destination, that is, information on luggage that is delivered to the trunk of the vehicle 10A in the future with respect to the current loading situation of the trunk of the vehicle 10A specified as described above. In this case, the loading situation specifying unit 3210 can acquire information on the request situation of the luggage for which the trunk of the vehicle 10A is designated as the delivery destination by inquiring of the delivery management server 50 via the communication processing unit 3201.

The loading situation specifying unit 3210 may be provided, for example, in the delivery management server 50. In the above case, the delivery availability determination unit 3209 of the center server 30 may acquire information on the loading situation of the trunk of the vehicle 10A from the delivery management server 50 by inquiring of the delivery management server 50 via the communication processing unit 3201.

The processing device 23 of the mobile terminal 20Ac of a deliverer includes the communication processing unit 231, the communication processing unit 232, the authentication key acquisition unit 233, the authentication request unit 234, and the locking and unlocking request unit 235, as described above.

In the embodiment, the description will be given on the premise that the functions of the authentication key acquisition unit 233, the authentication request unit 234, and the locking and unlocking request unit 235 of the mobile terminal 20Ac are available to the owner user by the key application being activated.

The authentication key acquisition unit 233 transmits the authentication key acquisition request to the delivery management server 50 via the communication processing unit 232 according to a predetermined manipulation by a deliverer. In the above-described case, the authentication key acquisition request includes the above-described delivery luggage information stored in the storage unit 230 in advance. Accordingly, the delivery management server 50 transmits an authentication key arrangement request to the center server 30 according to the authentication key acquisition request, the center server 30 distributes the authentication key to the mobile terminal 20Ac according to the authentication key arrangement request, and the mobile terminal 20Ac can acquire the authentication key. Therefore, the mobile terminal 20Ac can lock and unlock the trunk lid of the vehicle 10A based on the functions of the communication processing unit 231, the authentication request unit 234, and the locking and unlocking request unit 235, such that the deliverer can deliver the requested luggage to the trunk of the vehicle 10A, lock the trunk of the vehicle 10A, and return to the house.

Details of Configuration Regarding C2C Car Sharing Service

A configuration regarding a C2C car sharing service in the authentication key management system 1 will be described with reference to FIG. 5.

Figure 5:
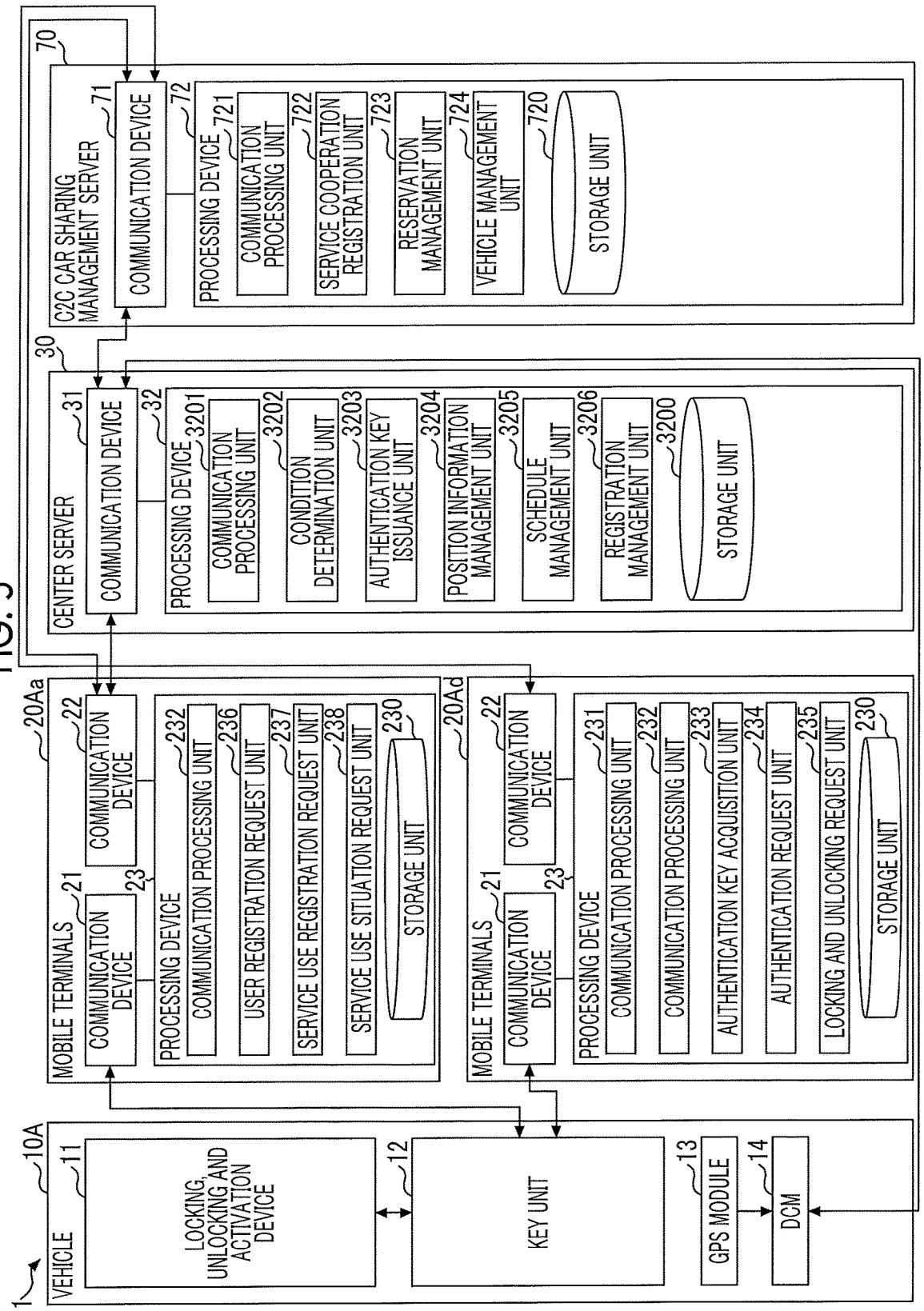
FIG. 5 is a diagram mainly illustrating an example of a configuration regarding a consumer to consumer (C2C) car sharing service in the authentication key management system.

FIG. 5 is a diagram mainly illustrating an example of the configuration regarding the C2C car sharing service in the authentication key management system 1. Hereinafter, the configuration regarding the C2C car sharing service in the authentication key management system 1 will be mainly described with respect to FIG. 5, and duplicate description on the configuration overlapping the above-described configuration regarding the key sharing service or the like will be omitted as much as possible.

The processing device 23 of the mobile terminal 20Aa carried by the owner user of the vehicle 10A includes the communication processing unit 232, the user registration request unit 236, the service use registration request unit 237, and the service use situation request unit 238, as described above.

The user registration request unit 236 requests the center server 30 to register the regular user (a sub-user) of the vehicle 10A who uses various services including the C2C car sharing service according to a predetermined manipulation by the owner user, as described above.

The service use registration request unit 237 requests the center server 30 to perform the registration of use of various services including the C2C car sharing service for each registered regular user (the owner user or the sub-user) according to a predetermined manipulation by the owner user, as described above.

For example, the service use registration request unit 237 transmits, as the service link information, a service use registration request for using the C2C car sharing service including a service login ID of a website for a user who uses the C2C car sharing service corresponding to the C2C car sharing management server 70 (hereinafter referred to as a "C2C car sharing site"), which corresponds to the regular user of the vehicle 10A that is a registration target, to the center server 30.

The service use situation request unit 238 requests the center server 30 to provide information on a use situation of various services (service use situation information) including the C2C car sharing service of the regular user of the vehicle 10A for which the use registration has been performed, in a form corresponding to the owner user ID according to a predetermined manipulation by the owner user, as described above.

The C2C car sharing management server 70 includes a communication device 71 and a processing device 72.

The communication device 71 is any device that performs bidirectional communication with each of the mobile terminal 20 and the center server 30 over a predetermined communication network.

The processing device 72 includes, for example, a communication processing unit 721, a service cooperation registration unit 722, a reservation management unit 723, and a vehicle management unit 724 as functional units that are realized by executing one or more programs stored in the ROM or the auxiliary storage device on the CPU. The processing device 72 includes a storage unit 720 that is realized as a storage area of an auxiliary storage device or the like of the server computer.

Description will be given on the premise that the information for specifying the vehicle 10A that is a lending target has already been registered (stored) in the storage unit 720 in an aspect in which the information is linked to the service login ID via the C2C car sharing site by the regular user (the owner user) of the vehicle 10A.

The communication processing unit 721 controls the communication device 71 to perform transmission and reception of various signals such as control signals or information signals to and from each of the mobile terminal 20 and the center server 30.

The service cooperation registration unit 722 performs information registration for cooperation between the center server 30 regarding the use of the C2C car sharing service of the regular user of the vehicle 10A and the C2C car sharing management server 70 according to the service use registration completion notification received from the center server 30 by the communication processing unit 721.

For example, the service cooperation registration unit 722 adds a flag indicating a lender of the vehicle 10A the C2C car sharing service to the service login ID included in the service use registration completion notification in the user management DB that manages the user of the C2C car sharing site constructed in the storage unit 720. The C2C car sharing management server 70 transmits the authentication key arrangement request including the service login ID corresponding to the regular user of the vehicle 10A, which is the lender, to the center server 30 such that it is possible to cause the authentication key to be distributed from the center server 30 to the mobile terminal 20Ad of the borrower, as described below.

The reservation management unit 723 manages reservation of use of the vehicle 10A that is performed through the C2C car sharing site or the like.

For example, the reservation management unit 723 receives registration of a date and time on which the vehicle 10A is rentable from the regular user of the vehicle 10A through the C2C car sharing site and registers (stores) the received date and time on which the vehicle 10A is rentable in the storage unit 720. When the date and time on which the vehicle 10A is rentable is registered (stored) in the storage unit 720, the reservation management unit 723 inquires of the center server 30 about the car use schedule information via the communication processing unit 721. Accordingly, the reservation management unit 723 can acquire the latest vehicle use schedule information via the communication processing unit 721. Therefore, the C2C car sharing management server 70, for example, can take countermeasures such as requesting to change the date and time on which the vehicle 10A is rentable, which is received from the regular user of the vehicle 10A, or registering a portion excluding an overlapping portion from the date and time on which the vehicle 10A is rentable as the date and time on which the vehicle 10A is rentable when the received date and time on which the vehicle 10A is rentable already overlaps another schedule or registering.

For example, the reservation management unit 723 receives the reservation of use of the vehicle 10A within a range of the date and time on which the vehicle 10A is rentable, which is stored in the storage unit 720. When the reservation management unit 723 receives the reservation of use of the vehicle 10A from a user who is a borrower through the C2C car sharing site, the reservation management unit 723 updates information on a lending schedule of the vehicle 10A (lending schedule information) stored in the storage unit 720.

For example, when the authentication key acquisition request is received from the mobile terminal 20Ad of the borrower of the vehicle 10A by the communication processing unit 721, the reservation management unit 723 determines whether or not the authentication key acquisition request is a regular authentication key acquisition request. Specifically, the reservation management unit 723 may perform the determination based on the service login ID and the password of the C2C car sharing site included in the authentication key acquisition request, or a relationship regarding the date and time of reservation of use (for example, within a range of the date and time of reservation of use or less than a predetermined time until a date and time of use start). When the authentication key acquisition request is a regular authentication key acquisition request, the reservation management unit 723 transmits an authentication key arrangement request to the center server 30 via the communication processing unit 721. When the authentication key arrangement request is transmitted to the center server 30, information for specifying the mobile terminal 20Ad of the borrower of the vehicle 10A is included in the authentication key arrangement request. The information for specifying the borrower of the vehicle 10A may be, for example, an authentication ID (hereinafter referred to as a "borrower ID" for convenience) for obtaining user authentication in the center server 30 in order for the borrower of the vehicle 10A to use a function of the authentication key acquisition unit 233 of the mobile terminal 20Ad. Accordingly, the mobile terminal 20Ad of the borrower of the vehicle 10A can acquire the authentication key from the center server 30.

The vehicle management unit 724 manages the vehicle 10A that is a lending target.

For example, the vehicle management unit 724 inquires of the center server 30 about a current position information of the vehicle 10A via the communication processing unit 721 before the date and time of reservation of use of the vehicle 10A (for example, a period from tens of minutes ago to immediately before). The vehicle management unit 724 acquires the current position information of the vehicle 10A replied from center server 30 according to the inquiry via the communication processing unit 721. Accordingly, a determination can be made as to whether or not the vehicle 10A returns to a designated place before a date and time of lending (a date and time of reservation of use) of the vehicle 10A. Accordingly, when the vehicle 10A does not return to the designated place, the C2C car sharing management server 70 can take countermeasures such as warning the regular user who is a lender of the vehicle 10A so that the vehicle 10A returns to the designated place through an e-mail or a predetermined application cooperating with the C2C car sharing site, which is installed in the mobile terminals 20Aa and 20Ab.

The processing device 32 of the center server 30 includes the communication processing unit 3201, the condition determination unit 3202, the authentication key issuance unit 3203, the position information management unit 3204, the schedule management unit 3205, the registration management unit 3206, and the storage unit 3200, as described above.

When the authentication key arrangement request is received from the C2C car sharing management server 70 by the communication processing unit 3201, the condition determination unit 3202 determines whether or not the authentication key arrangement request is a regular authentication key arrangement request. For example, the condition determination unit 3202 determines whether or not the authentication key arrangement request is the regular authentication key arrangement request based on the service link information included in the authentication key arrangement request (for example, the service login ID of the C2C car sharing site) or predetermined authentication information (for example, the ID and the password) corresponding to the C2C car sharing management server 70.

When the condition determination unit 3202 determines whether or not the authentication key arrangement request is a regular authentication key arrangement request, the authentication key issuance unit 3203 specifies the vehicle 10A corresponding to the authentication key arrangement request based on the user service registration information DB of the storage unit 3200. The authentication key issuance unit 3203 issues the authentication key in which a time is limited (for example, the vehicle is available solely at the date and time of reservation of use of the vehicle 10A included in the authentication key arrangement request and in a buffering period before and after the date and time of reservation of use of the vehicle 10A). The authentication key issuance unit 3203 distributes the authentication key to the mobile terminal 20Ad of the borrower of the vehicle 10A specified by the authentication key arrangement request via the communication processing unit 3201.

The C2C car sharing service may include, for example, a service (hereinafter referred to as "vehicle trunk lending service" for convenience) in an aspect in which solely a trunk of the vehicle 10A is lent. In the case of a vehicle trunk lending service, the authentication key issuance unit 3203 may issue an authentication key with an authority limited so that locking and unlocking of the trunk lid are allowed. Accordingly, it is possible to limit a lending target of C2C car sharing to solely the trunk. By limiting the lending target of the C2C car sharing to solely the trunk, for example, a trunk delivery service in an aspect in which the trunk of the vehicle 10A to be lent at a travel destination is borrowed and a purchased product for use at a travel destination is delivered to the borrowed trunk can be realized.

The position information management unit 3204 transmits a position information request to the vehicle 10A via the communication processing unit 3201 according to the inquiry about the current position of the vehicle 10A from the C2C car sharing management server 70 received by the communication processing unit 3201. Accordingly, the position information management unit 3204 can acquire the current position information from the vehicle 10A via the communication processing unit 3201. The position information management unit 3204 replies the C2C car sharing management server 70 with the current position information acquired from the vehicle 10A via the communication processing unit 3201.

The schedule management unit 3205 transmits the latest vehicle use schedule information to the vehicle 10A via the communication processing unit 3201 according to the inquiry about the current position of the vehicle 10A from the C2C car sharing management server 70 received by the communication processing unit 3201.

The registration management unit 3206 performs registration of the regular user (the sub-user) who uses various services including the C2C car sharing service according to the user registration request received from the mobile terminal 20Aa of the owner user by the communication processing unit 3201, as described above. The registration management unit 3206 performs registration of use of the C2C car sharing service by the regular user of the vehicle 10A according to the service use registration request received from the mobile terminal 20Aa of the owner user by the communication processing unit 3201, as described above. When the registration of use of various services including the C2C car sharing service has been completed, the registration management unit 3206 notifies the mobile terminals 20Aa and 20Ab corresponding to the regular users that are registration targets that the registration of use of various services including the C2C car sharing service has been completed via the communication processing unit 3201, as described above. When the registration of use of the C2C car sharing service has been completed, the registration management unit 3206 transmits a service use registration completion notification including the service link information to the C2C car sharing management server 70 that performs an operation and management of a service that is a registration target via the communication processing unit 3201.

The processing device 23 of the mobile terminal 20Ad of the borrower of the vehicle 10A includes the communication processing unit 231, the communication processing unit 232, the authentication key acquisition unit 233, the authentication request unit 234, the locking and unlocking request unit 235, and the storage unit 230, as described above.

The authentication key acquisition unit 233 transmits an authentication key acquisition request to the C2C car sharing management server 70 via the communication processing unit 232 according to a predetermined manipulation by the borrower of the vehicle 10A. When the authentication key acquisition request is transmitted, the service login ID of the C2C car sharing site corresponding to the borrower of the vehicle 10A is included in the authentication key acquisition request. Accordingly, the C2C car sharing management server 70 can transmit an authentication key arrangement request to the center server 30 according to the authentication key acquisition request, the center server 30 can distribute the authentication key to the mobile terminal 20Ad according to the authentication key arrangement request, and the mobile terminal 20Ad can acquire the authentication key. Therefore, the mobile terminal 20Ad can lock and unlock the door of the vehicle 10A based on the functions of the communication processing unit 231, the authentication request unit 234, and the locking and unlocking request unit 235. That is, the borrower of the vehicle 10A carrying the mobile terminal 20Ad can directly use the vehicle 10A, such as locking and unlocking the vehicle 10A and driving the vehicle 10A using the mobile terminal 20Ad without performing exchange of a key with the regular user of the vehicle 10A through the C2C car sharing service. Similarly, the regular user of the vehicle 10A can lend the vehicle 10A to another person other than the regular user without exchanging the key. Therefore, it is possible to improve convenience in lending and borrowing of the vehicle 10A between the regular user of the vehicle 10A and another person other than the regular user through the C2C car sharing service in the authentication key management system 1.

Details of Configuration Regarding B2C Car Sharing Service

A B2C car sharing service in the authentication key management system 1 will be described with reference to FIG. 6.

Figure 6:
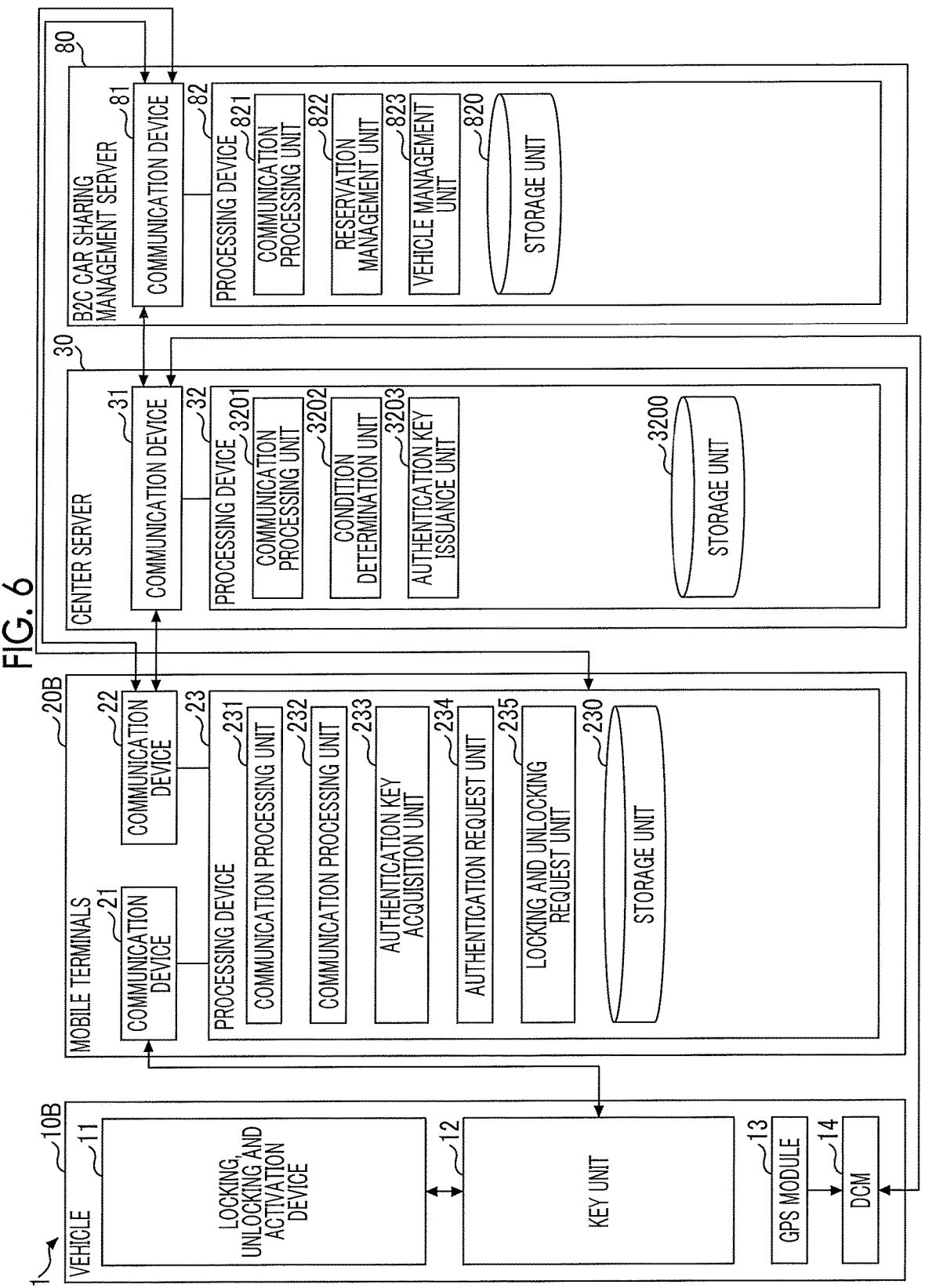
FIG. 6 is a diagram mainly illustrating an example of a configuration regarding a business to consumer (B2C) car sharing service in the authentication key management system.

FIG. 6 is a diagram mainly illustrating an example of the configuration regarding the B2C car sharing service in the authentication key management system 1. Hereinafter, the configuration regarding the B2C car sharing service in the authentication key management system 1 will be mainly described with respect to FIG. 6, and duplicate description on the configuration overlapping the above-described configuration regarding the key sharing service or the like will be omitted as much as possible.

The B2C car sharing management server 80 includes a communication device 81 and a processing device 82.

The communication device 81 is any device that performs bidirectional communication with each of the mobile terminal 20B and the center server 30 over a predetermined communication network.

The processing device 82 includes, for example, a communication processing unit 821, a reservation management unit 822, and a vehicle management unit 823 as functional units that are realized by executing one or more programs stored in the ROM or the auxiliary storage device on the CPU. The processing device 82 includes a storage unit 820 that is realized as a storage area of an auxiliary storage device or the like of the server computer.

The communication processing unit 821 controls the communication device 81 to perform transmission and reception of various signals such as control signals or information signals to and from each of the mobile terminal 20B and the center server 30.

The reservation management unit 822 manages the reservation of use of the vehicle 10B that is performed through the B2C car sharing site or the like.

For example, the reservation management unit 822 receives reservation of use of the vehicle 10B from a user (hereinafter referred to as "borrower user") who wants to borrow the vehicle 10B through a website that is operated by a company of the B2C car sharing management server 80 or the like (hereinafter referred to as a "B2C car sharing site" for convenience). The reservation management unit 822 stores information on the received reservation of use of the vehicle 10B (use reservation information) in the storage unit 820. When the information on use reservation is stored in the storage unit 820, for example, information for specifying the vehicle 10A that is a target, information on a date and time of reservation of use (a start date and time of use and an end date and time of use), and a service login ID of the borrower user in the B2C car sharing site may be included in the use reservation information.

For example, the reservation management unit 822 updates the information on the use schedule of the vehicle 10B (the vehicle use schedule information) stored in the storage unit 820 each time the reservation management unit 822 receives the reservation of use of the vehicle 10B. Accordingly, the B2C car sharing management server 80 can display the use schedule of the vehicle 10B on the B2C car sharing site to present a date and time when the reservation of use can be made, to the borrower user.

For example, when the authentication key request is received from the mobile terminal 20B by the communication processing unit 821, the reservation management unit 822 determines whether or not the authentication key request is a regular authentication key request. Specifically, the reservation management unit 822 may perform the determination based on the service login ID and the password of the B2C car sharing site corresponding to the borrower user included in the authentication key request, or a relationship regarding the date and time of reservation of use (for example, within a range of the date and time of reservation of use or less than a predetermined time until a date and time of use start). When the authentication key request is a regular authentication key acquisition request, the reservation management unit 822 transmits an authentication key arrangement request to the center server 30 via the communication processing unit 821. When the authentication key arrangement request is transmitted to the center server 30, information for specifying the mobile terminal 20B of the borrower user borrowing the vehicle 10B is included in the authentication key arrangement request. The information for specifying the borrower user borrowing the vehicle 10B may be, for example, an authentication ID (hereinafter referred to as a "borrower user ID" for convenience) for obtaining user authentication in the center server 30 in order for the borrower user borrowing the vehicle 10B to use a function of a key application corresponding to the authentication key acquisition unit 233 of the mobile terminal 20B or the like. Accordingly, the mobile terminal 20B of the borrower user borrowing the vehicle 10B can acquire the authentication key from the center server 30.

The vehicle management unit 823 manages the vehicle 10B that is a lending target.

For example, the vehicle management unit 823 inquires of the center server 30 about the vehicle 10B parked in the vicinity (for example, within hundreds of meters) of a place designated in the reservation of use via the communication processing unit 821 before the date and time of reservation of use of the vehicle 10B of a borrower user (for example, before tens of minutes). The vehicle management unit 823 acquires the position information of the vehicle 10B parked in the vicinity of the designated place replied from center server 30 according to the inquiry via communication processing unit 821. Accordingly, the vehicle management unit 823 can specify one or a plurality of vehicles 10B parked around the designated place and determine, for example, the vehicle 10B to be lent before the start date and time of use of the vehicle 10B of the borrower.

For example, the vehicle management unit 823 inquires of the center server 30 about the position information of the vehicle 10B in the designated area via the communication processing unit 821 according to a search request of the vehicle 10B in a designated area by the borrower user at the B2C car sharing site. The vehicle management unit 823 acquires the position information of the vehicle 10B in the designated area replied from center server 30 according to the inquiry via communication processing unit 821. Accordingly, the vehicle management unit 823, for example, can present the position information of the vehicle 10B that is a target to the borrower user who wants to borrow the vehicle 10B in the designated area immediately at the B2C car sharing site.

The processing device 32 of the center server 30 includes the communication processing unit 3201, the condition determination unit 3202, the authentication key issuance unit 3203, and the storage unit 3200, as described above.

When the authentication key arrangement request received from the B2C car sharing management server 80 is received by the communication processing unit 3201, the condition determination unit 3202 determines whether or not the authentication key arrangement request is a regular authentication key arrangement request. For example, the condition determination unit 3202 determines whether or not the authentication key arrangement request is the regular authentication key arrangement request based on whether or not the borrower user ID included in the authentication key arrangement request is the authentication ID already registered in the storage unit 3200, or on predetermined authentication information (for example, an ID Password) corresponding to the B2C car sharing management server 80.

When the condition determination unit 3202 determines whether or not the authentication key arrangement request is the regular authentication key arrangement request, the authentication key issuance unit 3203 issues the authentication key in which a time is limited (for example, the vehicle is available solely at the date and time of reservation of use of the vehicle 10B included in the authentication key arrangement request and in a buffering period before and after the date and time of reservation of use of the vehicle 10B). The authentication key issuance unit 3203 distributes the authentication key to the mobile terminal 20B of the borrower user borrowing the vehicle 10B specified by the authentication key arrangement request via the communication processing unit 3201.

The processing device 23 of the mobile terminal 20B of the borrower user borrowing the vehicle 10B includes the communication processing unit 231, the communication processing unit 232, the authentication key acquisition unit 233, the authentication request unit 234, the locking and unlocking request unit 235, and the storage unit 230, as described above.

The authentication key acquisition unit 233 transmits an authentication key acquisition request to the B2C car sharing management server 80 via the communication processing unit 232 according to a predetermined manipulation by the borrower user of the vehicle 10B. When the authentication key acquisition request is transmitted, the service login ID of the B2C car sharing site corresponding to the borrower user borrowing the vehicle 10B is included in the authentication key acquisition request. Accordingly, the B2C car sharing management server 80 can transmit an authentication key arrangement request to the center server 30 according to the authentication key acquisition request, the center server 30 can distribute the authentication key to the mobile terminal 20B according to the authentication key arrangement request, and the mobile terminal 20B can acquire the authentication key. Therefore, the mobile terminal 20B can lock and unlock the door of the vehicle 10B based on the functions of the communication processing unit 231, the authentication request unit 234, and the locking and unlocking request unit 235. That is, the borrower user borrowing the vehicle 10B carrying the mobile terminal 20B can directly use the vehicle 10B, such as locking and unlocking the vehicle 10B and driving the vehicle 10B using the mobile terminal 20B without performing exchange of a key with the company of the vehicle 10B through the B2C car sharing service. Therefore, it is possible to improve convenience for the borrower user borrowing the vehicle 10B through the B2C car sharing service in the authentication key management system 1.

Characteristic Operation of Center Server

A characteristic operation of the center server 30, that is, a process of providing the user with information needed for designating the trunk of the vehicle 10 A as the delivery destination of the product in the order information input page of the EC site (vehicle-related information providing process) will be described with reference to FIGS. 7 to 10.

Figure 7:
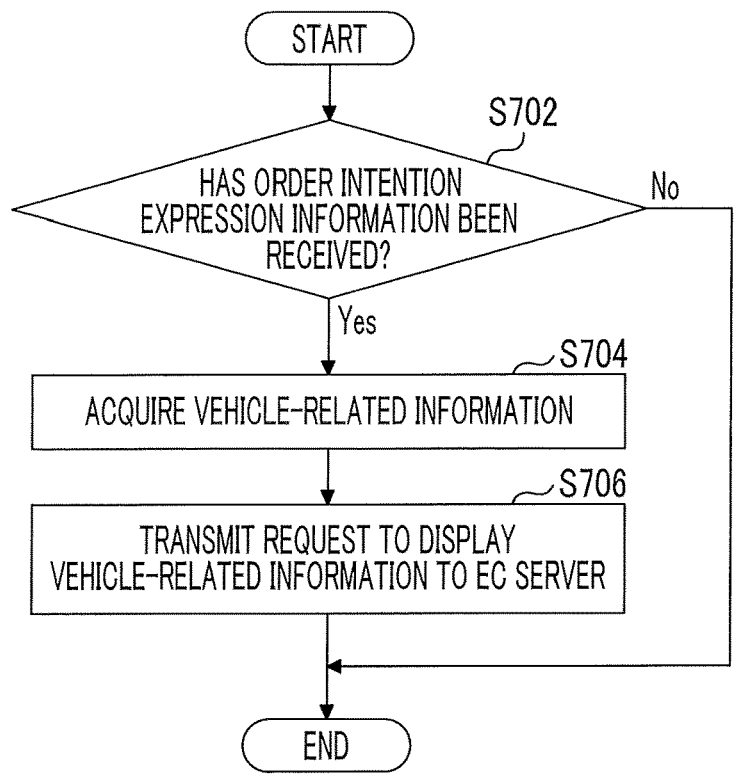
FIG. 7 is a flowchart illustrating a first example of a vehicle-related information providing process in a center server.

FIG. 7 is a flowchart schematically showing a first example of the vehicle-related information providing process of the center server 30. The process according to this flowchart is repeatedly executed, for example, in predetermined control periods. The same applies to the flowcharts of FIGS. 8 to 10.

In step S702, the vehicle-related information providing unit 3208 determines whether or not information indicating that the user (the regular user of the vehicle 10A) tries to order a product in the EC site (order intention expression information) has been received from the EC server 60 via the communication processing unit 3201. The order intention expression information is transmitted to the center server 30 via the communication processing unit 521, for example, when a manipulation input for a transition from a web page (a product cart page) displaying products in a cart to an order information input page is performed by the user at the EC site. The order intention expression information may include information for specifying the user, such as a service login ID at the EC site. Thus, the vehicle-related information providing unit 3208 can specify the vehicle 10A that is a target based on the user service registration information DB of the storage unit 3200 and the service login ID. When the order intention expression information is received from the EC server 60, the vehicle-related information providing unit 3208 proceeds to step S704 and, otherwise, ends this current process.

In step S704, the vehicle-related information providing unit 3208 acquires vehicle-related information (including no delivery availability information).

In step S706, the vehicle-related information providing unit 3208 transmits a request including the vehicle-related information to display the vehicle-related information on the order information input page to the EC server 60 via the communication processing unit 3201, and ends this process. Accordingly, the EC server 60 displays the vehicle-related information on the order information input page. Therefore, when the user orders a product, the user can designate the trunk of the vehicle 10A as a delivery destination using the vehicle-related information so that the delivery destination is settled. The center server 30 provides the vehicle-related information to the EC server 60 solely when the user expresses intention to order the product. Therefore, it is possible to cause the user to designate the trunk of the vehicle 10A as the delivery destination of the product while considering the privacy of the user of the vehicle 10A.

Figure 8:
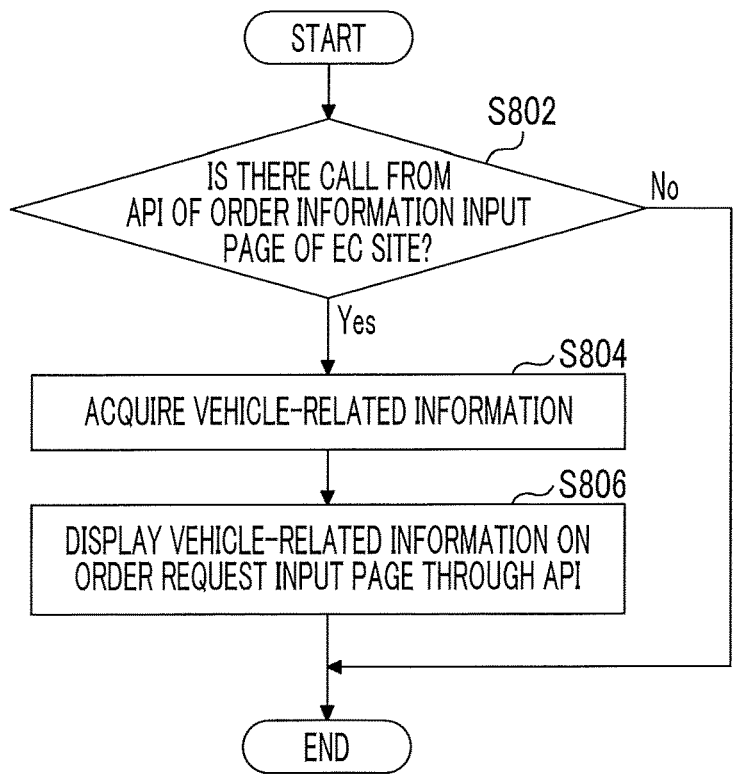
FIG. 8 is a flowchart illustrating a second example of the vehicle-related information providing process in the center server.

Subsequently, FIG. 8 is a flowchart schematically illustrating a second example of the vehicle-related information providing process of the center server 30.

In step S802, the vehicle-related information providing unit 3208 determines whether or not there been a call from an application programming interface (API) embedded in the order information input page of the EC site. The vehicle-related information providing unit 3208 proceeds to step S804 when there been the call through the API and ends this current process when there been no call.

In step S804, the vehicle-related information providing unit 3208 acquires the vehicle-related information.

In step S806, the vehicle-related information providing unit 3208 displays the vehicle-related information on the order information input page through the API and ends this process. Accordingly, the center server 30 can directly cause the vehicle-related information to be displayed on the order information input page that the user browses with a browser of his or her own terminal (for example, mobile terminals 20Aa, 20Ab) without transmitting the vehicle-related information to the center server 30. Therefore, the center server 30 can establish a mechanism of a trunk delivery service in more consideration to the privacy of the user.

Figure 9:
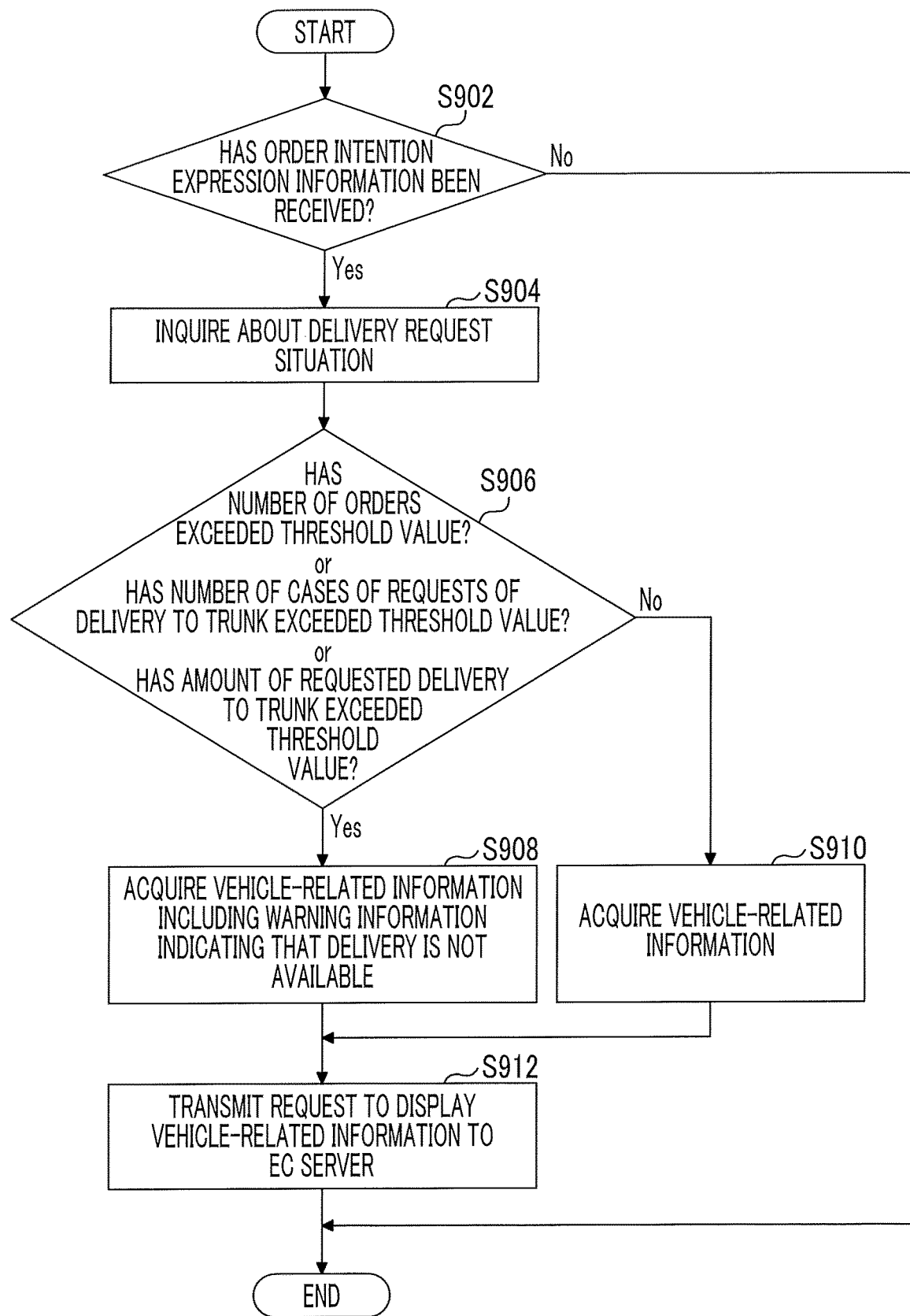
FIG. 9 is a flowchart illustrating a third example of the vehicle-related information providing process in the center server.

Subsequently, FIG. 9 is a flowchart schematically showing a third example of the vehicle-related information providing process of the center server 30.

In step S902, the vehicle-related information providing unit 3208 determines whether order intention expression information has been received from the EC server 60 via the communication processing unit 3201, as in step S702 in FIG. 7. When the order intention expression information is received from the EC server 60, the vehicle-related information providing unit 3208 proceeds to step S904 and, otherwise, ends this current process.

In step S904, the vehicle-related information providing unit 3208 inquires of the delivery management server 50 about a delivery request situation in which the trunk of the vehicle 10A has been designated as the delivery destination, via the communication processing unit 3201.

In step S906, the vehicle-related information providing unit 3208 determines a state in which the number of ordered products exceeds a predetermined threshold value, a state in which the number of requests of delivery to the trunk of the vehicle 10A that has been requested exceeds a predetermined threshold value, or a state in which the amount of requested delivery to the trunk of the vehicle 10A exceeds a predetermined threshold value. In any one of the states, the vehicle-related information providing unit 3208 determines that there is a possibility that the product cannot be delivered to the trunk of the vehicle 10A and proceeds to step S908 and otherwise, proceeds to step S912.

In step S908, the vehicle-related information providing unit 3208 acquires vehicle-related information including warning information (information for warning delivery unavailable) indicating that there is a possibility that the product cannot be delivered to the trunk of the vehicle 10A.

On the other hand, in step S910, the vehicle-related information providing unit 3208 acquires vehicle-related information including no information for warning delivery unavailable, as in step S704 in FIG. 7.

In step S910, the vehicle-related information providing unit 3208 transmits the vehicle-related information acquired in steps S908 and S910 to the EC server 60 via the communication processing unit 3201 and ends this process. Accordingly, the EC server 60 causes a warning that there is a possibility that the product cannot be delivered to the trunk of the vehicle 10A to be displayed on the order information input page of the EC site. Therefore, when there is a possibility that the product cannot be delivered to the trunk of the vehicle 10A, the center server 30 can warn the user about the fact and prompt designation of a delivery destination other than the trunk of the vehicle 10A.

Although the processes of steps S904 to S908 are added to the flowchart of FIG. 7 in this example (FIG. 9), the processes of steps S904 to S908 may be added to the flowchart of FIG. 8. That is, the vehicle-related information providing unit 3208 may cause the vehicle-related information including the information for warning delivery unavailable to be displayed on the order input information page of the EC site via the API. Thus, the same operation and effects can be obtained.

Subsequently, FIG. 10 is a flowchart schematically showing a fourth example of the vehicle-related information providing process of the center server 30.

In step S1002, the vehicle-related information providing unit 3208 determines whether the order intention expression information has been received from the EC server 60 via the communication processing unit 3201, as in step S702 in FIG. 7. When the order intention expression information is received from the EC server 60, the vehicle-related information providing unit 3208 proceeds to step S1004 and, otherwise, ends this current process.

In step S1004, the delivery availability determination unit 3209 determines whether or not delivery of the product that the user intends to order, to the trunk of the vehicle 10A is available.

In step S1006, the vehicle-related information providing unit 3208 acquires vehicle-related information including a determination result (delivery availability information) of the delivery availability determination unit 3209.

In step S1008, the vehicle-related information providing unit 3208 transmits the acquired vehicle-related information to the EC server 60 via the communication processing unit 3201. Accordingly, the center server 30 can present the vehicle-related information including the delivery availability information to the user in the order information input page of the EC site.

Although the process of step S1004 is added between step S702 and step S704 in the flowchart of FIG. 7 in this example (FIG. 10), the process of step S1004 may be added between step S802 and step S804 of the flowchart of FIG. 8. That is, the vehicle-related information providing unit 3208 may cause the vehicle-related information including the delivery availability information to be displayed on the order input information page of the EC site via the API. Thus, the same operation and effects can be obtained.

Operation

Thus, in the embodiment, the vehicle-related information providing unit 3208 assists in an operation of a delivery service in which a vehicle cabin of the vehicle 10A (for example, a trunk) used by the purchaser can be designated as a delivery destination of a purchased product of a predetermined website (EC site) regarding electronic commerce. Specifically, the vehicle-related information providing unit 3208 transmits vehicle-related information for causing the vehicle cabin of the vehicle 10A used by the user to be designated as the delivery destination of the product (vehicle-related information) to the EC server 60 or a terminal (for example, the mobile terminals 20Aa and 20Ab) with which the user browses the EC site when information indicating that there is an expression of intention of the user to order the product in the EC site (specifically, for example, a call from an API embedded in an order intention expression information or an order input information page) is received from the EC server 60 operating the EC site.

Accordingly, the center server 30 may limit the vehicle-related information of the user transmitted to the EC site or the like to the vehicle-related information for designating the vehicle cabin of the vehicle 10A of the user as the delivery destination of the product. The center server 30 can transmit the vehicle-related information to the EC site or the like solely when the user has expressed intention to order the product. Therefore, a situation in which all pieces of information on the vehicle 10A of the user are provided to the EC server 60 operating the EC site or the like at any timing is suppressed. Therefore, it is possible to establish a mechanism for causing the vehicle cabin of the vehicle 10A to be designated as the delivery destination of the product while taking the privacy of the user into consideration.

In the embodiment, the vehicle-related information may be transmitted to the EC server 60 or the terminal with which the user browses the EC site and displayed on a predetermined web page of the EC site in a case where the user expresses an intermediate (temporary) order intention in place of the case where the user expresses a final order intention, as in the time of transition to the order information input page of the EC site, or in addition to the case where the user expresses the final order intention. In this case, the intermediate intention expression includes, for example, a case where the user puts a specific product in a virtual shopping cart at the EC site, or a case where the user determines a specification of a specific product and performs an estimation. That is, in the embodiment, the expression of the intention of the user to order the product includes not only an expression of intention for a final order, but also an expression of intention for an order in an intermediate stage. Thus, the user can confirm that the vehicle cabin of the vehicle 10A can be designated as the delivery destination of the product before a stage of finally settling the order. Therefore, since, for example, a user deciding to purchase a product when the product can be delivered to the vehicle cabin of the vehicle 10A can also be supposed, the center server 30 can prompt the user to purchase the product.

In the embodiment, when information indicating that there is an expression of intention to order the product from the user in the EC site (specifically, for example, a call from the API embedded in the order intention expression information or the order input information page) is received from the EC server 60 operating the EC site, the vehicle-related information providing unit 3208 causes vehicle-related information for causing the trunk of the vehicle 10A used by the user to be designated as the delivery destination of the product (vehicle-related information) to be displayed on a predetermined web page (order information input page) of the EC site to be browsed by the user.

Thus, the center server 30 can control information on the vehicle 10A used by the user, which is displayed on the EC site.

In the embodiment, the vehicle-related information providing unit 3208 causes the vehicle-related information to be displayed on the order information input page of the EC site without going through the EC server 60.

Accordingly, the center server 30 does not need to transmit the vehicle-related information to the EC server 60 operating the EC site in order to cause the vehicle-related information to be displayed on the order information input page of the EC site. Therefore, it is possible to establish a mechanism taking the privacy of the user into consideration.

In the embodiment, the vehicle-related information providing unit 3208 causes the vehicle-related information to be displayed on the web page via a predetermined API embedded in an order input information page for designating or inputting information needed for a user to order the product.

Accordingly, when shift to the order information input page in which, for example, the information needed for ordering the product of the EC site is designated occurs, that is, when the user expresses intention to order the product, the center server 30 can cause the vehicle-related information to be displayed on the order information input page through the API embedded in the web page. Therefore, the center server 30 can specifically cause the vehicle-related information to be displayed on the web page without transmitting the vehicle-related information to the EC server 60 operating the EC site.

In the embodiment, the vehicle-related information providing unit 3208 causes a warning indicating that delivery of the product to the trunk of the vehicle is likely not to be available to be displayed on the web page or prevents the user from selecting the trunk of the vehicle 10A as the delivery destination of the product, in a case where the user requests the delivery to the trunk of the vehicle exceeding a predetermined number of cases or a predetermined capacity when the user requests an order of the product exceeding the predetermined number.

Thus, the center server 30 can prompt the user not to select the trunk of the vehicle 10A as the delivery destination by issuing a warning when the user tries to cause a large amount of luggage including a product to be ordered this time to be delivered to the trunk of the vehicle 10A. The center server 30 can forcibly prevent the trunk of the vehicle 10A from being selected as the delivery destination of the product when the user tries to cause a large amount of luggage including a product to be ordered this time to be delivered to the trunk of the vehicle 10A.

In the embodiment, the delivery availability determination unit 3209 determines whether the delivery of the product to the trunk of the vehicle 10A is available. The vehicle-related information includes a determination result (delivery availability information) of the delivery availability determination unit 3209.

Accordingly, the center server 30 can determine whether or not the delivery is available and display a result of the determination on the web page of the EC site in advance. Therefore, the center server 30, for example, can avoid the occurrence of a situation in which the product cannot be delivered as a result for reasons such as the trunk being full or the vehicle 10A being outside a deliverable area despite the trunk of the vehicle 10A having been designated as the delivery destination of the product by the user.

In the embodiment, the vehicle-related information providing unit 3208 allows the user to designate the trunk of the vehicle 10A as a delivery destination of the product on the web page solely when the delivery availability determination unit 3209 determines that delivery of the product to the trunk of the vehicle 10A is available.

Thus, when the center server 30 determines that the product cannot be delivered to the trunk of the vehicle 10A, it is possible to prevent the trunk of the vehicle 10A from being designated as the delivery destination of the product.

In the embodiment, when the delivery availability determination unit 3209 determines that the delivery of the product to the trunk of the vehicle 10A is not available, the vehicle-related information providing unit 3208 causes a display to be performed so that the user is prevented from selecting an option of the trunk of the vehicle 10A as the delivery destination of the product or causes an indication that the product cannot be delivered to the trunk of the vehicle 10A to be displayed on the web page.

Thus, the center server 30 can recognize a situation in which the delivery of the product to the trunk of the vehicle 10A is not available for some reason on the premise that the trunk of the vehicle 10A serving as an option of the delivery destination of the product is prepared for the user.

In the embodiment, a loading situation specifying unit 3210 that specifies the loading situation of the trunk of the vehicle 10A is further included, and the delivery availability determination unit 3209 determines that the delivery of the product to the trunk of the vehicle 10A as the delivery destination of the product is not available when the loading situation specified by the loading situation specifying unit 3210 exceeds a predetermined reference.

Thus, the center server 30 can prevent the trunk of the vehicle 10A from being designated as the delivery destination of the product in a situation in which the loading situation of the trunk of the vehicle 10A is a situation in which a predetermined reference is exceeded and the trunk is substantially full.

In the embodiment, the loading situation specifying unit 3210 specifies the loading situation of the trunk of the vehicle 10A based on the situation of the delivery of the luggage to the trunk of the vehicle 10A and the situation of reception of the luggage from the trunk of the vehicle 10A.

Accordingly, the center server 30 can finally recognize, for example, how much the delivered luggage is present after a date and time at which the luggage of the trunk has been received, from the situation of the delivery of the luggage to the trunk and the situation of reception of the luggage from the trunk. Therefore, the center server 30 can specifically specify the loading situation of the trunk of the vehicle 10A.

In the embodiment, the communication processing unit 3201 acquires a captured image of the inside of the trunk at the time of delivery completion (an image at the time of delivery completion) captured with the camera of the mobile terminal by the deliverer who has delivered the luggage to the trunk of the vehicle 10A. The loading situation specifying unit 3210 specifies the loading situation of the trunk of the vehicle 10A based on the image at the time of delivery completion acquired via the communication processing unit 3201.

Accordingly, the center server 30 can specifically specify the loading situation of the trunk of the vehicle 10A from the captured image captured by the camera of the mobile terminal carried at the time of delivery completion by the deliverer who has delivered the luggage to the vehicle 10A most recently.

In the embodiment, the delivery availability determination unit 3209 determines whether or not the delivery of the product to the trunk of the vehicle 10A is available based on the type of the product.

Thus, for example, when the product is food, the center server 30 supposes a situation in which the trunk of the vehicle 10A becomes at a high temperature under hot weather in the summer or falls below a freezing point in the winter, and therefore, the center server 30 can determine, for example, that the delivery to the trunk of the vehicle 10A is not available. In the case of a long product having a certain length such as a ski or a surfboard, for example, the center server 30 determines, for example, that the delivery to the trunk of the vehicle 10A is not available since the long product cannot fit in the trunk of the vehicle 10A. Therefore, the center server 30 can specifically determine whether or not the delivery of the product to the trunk of the vehicle 10A is available.

In the embodiment, when the type of the product is a product needing refrigeration or a product needing freezing, the delivery availability determination unit 3209 determines whether or not the delivery of the product to the trunk of the vehicle 10A is available based on whether or not a cold storage facility or a cold storage product is present in the trunk of the vehicle 10A.

Thus, the center server 30 can specifically determine whether or not the delivery of the product to the trunk of the vehicle 10A is available based on the type of the product.

In the embodiment, the delivery availability determination unit 3209 determines whether or not the delivery of the product to the trunk of the vehicle 10A is available based on the parking position of the vehicle 10A.

Thus, the center server 30 can determine whether or not the delivery is available, for example, according to whether the parking position of the vehicle 10A is within the deliverable area or outside the deliverable area. Therefore, the center server 30 can specifically determine whether or not the product can be delivered to the trunk of the vehicle 10A.

In the embodiment, the delivery availability determination unit 3209 determines whether or not the delivery of the product to the trunk of the vehicle 10A is available based on the vehicle type information of the vehicle 10A.

Thus, since the size or shape of the trunk of the vehicle 10A may differ according to the vehicle type of vehicle 10A, the center server 30 can determine whether or not the delivery of the product to the trunk of the vehicle 10A is available in consideration of the difference for each vehicle type of the vehicle. Therefore, the center server 30 can specifically determine whether or not the delivery of the product to the trunk of the vehicle 10A is available.

The embodiments have been described in detail above, but the present disclosure is not limited to the specific embodiments as described above, and various modifications and changes can be performed without departing from the gist of the present disclosure described in the claims.

For example, in the embodiment described above, the mobile terminal 20 transmits the authentication request including the authentication key to the key unit 12, and the key unit 12 performs exchange of signals with the locking, unlocking and activation device 11 according to an authentication result based on the authentication key. Therefore, the locking and unlocking of the doors of the vehicle 10A by the locking, unlocking and activation device 11 and the activation of the vehicle 10A are realized, but the present disclosure is not limited to the above aspect.

Specifically, a configuration in which the function of the key unit 12 is transferred to the mobile terminal 20, and the mobile terminal 20 performs exchange of signals based on the above-described key information (internal key information) with the vehicle 10 (the locking, unlocking and activation device 11) using the LF radio waves and the RF radio waves such that the locking and unlocking of the doors of the vehicle 10A and the activation of the vehicle 10A by the locking, unlocking and activation device 11 are realized may be adopted. In the above-described case, the "authentication key" of the embodiment described above may be read as the "key information". That is, the center server 30 may issue the key information instead of the authentication key and distribute the key information to the mobile terminal 20 in the same method as in the authentication key in the above-described embodiment. Accordingly, the same operation and effects as those of the above-described embodiment can be obtained.

The functions of the key unit 12 may be integrated with the locking, unlocking and activation device 11, and a configuration regarding communication between the locking, unlocking and activation device 11 and the key unit 12 and authentication related to the communication (the LF radio wave transmitter 111, the RF radio wave receiver 112, the collating ECU 113, the LF radio wave receiver 121, and the RF radio wave transmitter 122) may be omitted. In the above-described case, when the authentication of the mobile terminal 20 based on the authentication key has been successful, the key ECU 124 may directly output an unlocking command or a locking command and an activation command to each of the body ECU 114 and the engine ECU 116 instead of the collating ECU 113, and perform locking and unlocking the doors of the vehicle 10 and activation of the vehicle 10. Accordingly, the same operation and effects as those of the above-described embodiment can be obtained.

In the embodiments and the modification examples described above, the target of locking and unlocking using the transmission signal (an authentication signal or the like) transmitted from the mobile terminal is the vehicle, but the present disclosure is not limited to this aspect. The vehicle according to the embodiments and the modification examples described above may be replaced with a building or a facility that is used by a user, such as a house, a villa, or a conference room.

Specifically, the in-vehicle cabin delivery service, the in-vehicle cabin collection service, or the vehicle cabin recovery service can be replaced with a delivery service, collection service, or recovery service in which the inside of a building (for example, a house or a private villa) or a facility (for example, a condominium or a conference room)

that is used by a user can be designated as a delivery destination, a collection source, or a recovery source of luggage or products. In the above case, the "inside of the facility" means a place at which invasion from the outside is prevented through locking at the facility, and may include not only the inside of a building of the facility but also, for example, a place at which a roof is not provided, on the inner side of a relatively high outside fence partitioning the facility. Accordingly, it is possible to establish a mechanism that causes the inside of the building or the facility used by a user to be designated as a delivery destination of products while taking the privacy of the user into consideration, similar to the above-described embodiment.

The C2C car sharing service may be replaced with a C2C sharing service that assists in lending and borrowing of some or all rooms of a privately own house or villa between individuals. Accordingly, it is possible to realize sharing of part or all of a privately own house, villa, or the like between individuals.

The B2C car sharing service may be replaced with a B2C sharing service in which a facility (for example, a condominium, a conference room, or a gymnasium) that can be used by a plurality of users in different time periods, which is owned by a company, an organization, or the like is lent to a user. Accordingly, sharing among general consumers of a facility that a plurality of users can use in different time periods, which is owned by a company, an organization, or the like, can be realized.

What is claimed is:

1. A delivery assistance device that assists in an operation of a delivery service in which an inside of a vehicle, a building, or a facility that is used by a purchaser is designated as a delivery destination of one or more products purchased via a website regarding electronic commerce, the delivery assistance device comprising:
    at least one processor configured to, in response to receiving user information indicating that a user intends to order the one or more products in the website from an external device operating the website:
        transmit delivery destination information to a terminal at which the user browses the web site; and
        cause the delivery destination information to be displayed on a predetermined web page, of the website operated by the external device and browsed by the user on the terminal, on the terminal before settling the order without the delivery destination information passing through the external device,
    wherein the delivery destination information relates to the vehicle, the building, or the facility for the user to designate the inside of the vehicle, the building, or the facility that is used by the user as the delivery destination of the one or more products.

2. The delivery assistance device according to claim 1, wherein the at least one processor is configured to transmit the delivery destination information solely when delivery of the one or more products to the delivery destination is available.

3. The delivery assistance device according to claim 1, wherein the user information indicating that the user intends to order the one or more products in the website includes at least one of:
    information indicating a manipulation input for a transition from a product cart page displaying products in a cart to an order information input page is performed by the user; and
    information indicating that the user determines a specification of a specific product and performs an estimation.

4. The delivery assistance device according to claim 1, wherein the at least one processor is configured to cause the delivery destination information on the vehicle, the building, or the facility to be displayed on the predetermined web page via a predetermined application programming interface embedded in the predetermined web page, the predetermined web page being used for designating or inputting information needed for the user to order the one or more products.

5. The delivery assistance device according to claim 1, wherein the at least one processor is configured to cause a warning, indicating that delivery of the one or more products to a trunk of the vehicle is likely not to be available, to be displayed on the predetermined web page or prevent the user from selecting the trunk of the vehicle as the delivery destination of the one or more product, when a number of products to be delivered to the trunk of the vehicle based on a user's request exceeds a predetermined number or a total volume of the one or more products to be delivered to the trunk of the vehicle based on the user's request exceeds a predetermined capacity.

6. The delivery assistance device according to claim 1, wherein
    the at least one processor is configured to determine whether or not the delivery of the one or more products to a trunk of the vehicle is available, and
    the delivery destination information on the vehicle, the building, or the facility includes a determination result of the determination.

7. The delivery assistance device according to claim 6, wherein the at least one processor is configured to allow the user to designate the trunk of the vehicle as the delivery destination of the one or more products in the predetermined web page solely when the at least one processor determines that the delivery of the one or more products to the trunk of the vehicle is available.

8. The delivery assistance device according to claim 7, wherein when the at least one processor determines that the delivery of the one or more products to the trunk of the vehicle is not available, the at least one processor is configured to cause a display to be performed so that the user is prevented from selecting an option of the trunk of the vehicle as the delivery destination of the one or more products or cause an indication that the one or more products is not able to be delivered to the trunk of the vehicle to be displayed on the predetermined web page.

9. The delivery assistance device according to claim 6, further wherein the at least one processor is configured to
    specify a loading situation of the trunk of the vehicle, and
    determine that the delivery of the one or more products to the trunk of the vehicle as the delivery destination of the one or more products is not available when the loading situation exceeds a predetermined reference.

10. The delivery assistance device according to claim 9, wherein the at least one processor is configured to specify the loading situation of the trunk of the vehicle based on at least one of a total volume or a number of the one or more products which have been delivered to the trunk of the vehicle and a total volume or a number of the one or more products which the trunk of the vehicle has received.

11. The delivery assistance device according to claim 10, wherein the at least on processor is configured to
    acquire an image of an inside of the trunk at a time of delivery completion, the image being captured with a camera of a mobile terminal by a deliverer who has delivered the one or more products to the trunk of the vehicle, and specify the loading situation of the trunk of the vehicle based on the image.

12. The delivery assistance device according to claim 6, wherein the at least one processor is configured to determine whether or not the delivery of the one or more products to the trunk of the vehicle is available based on a type of each of the one or more products.

13. The delivery assistance device according to claim 12, wherein when the one or more products include a product needing refrigeration or a product needing freezing, the at least one processor is configured to determine whether or not the delivery of the one or more products to the trunk of the vehicle is available based on whether or not a cold storage facility or a cold storage product is present in the trunk of the vehicle.

14. The delivery assistance device according to claim 6, wherein the at least one processor is configured to determine whether or not the delivery of the one or more products to the trunk of the vehicle is available based on a parking position of the vehicle.

15. The delivery assistance device according to claim 6, wherein the at least one processor is configured to determine whether or not the delivery of the one or more products to the trunk of the vehicle is available based on information on a vehicle type of the vehicle.

16. A delivery assistance method that is executed by a delivery assistance device that assists in an operation of a delivery service in which an inside of a vehicle, a building, or a facility that is used by a purchaser is designated as a delivery destination of one or more products purchased via a website regarding electronic commerce, the delivery assistance method comprising:
   in response to receiving user information indicating that a user intends to order the one or more products in the website from an external device operating the website:
      transmitting delivery destination information to a terminal at which the user browses the web site; and
      causing the delivery destination information to be displayed on a predetermined web page, of the website operated by the external device and browsed by the user on the terminal, on the terminal before settling the order without the delivery destination information passing through the external device,
   wherein the delivery destination information relates to the vehicle, the building, or the facility for the user to designate the inside of the vehicle, the building, or the facility that is used by the user as the delivery destination of the one or more products.

17. A non-transitory computer-readable computer medium storing a delivery assistance program causing an information processing device to execute:
   in response to receiving user information indicating that a user intends to order one or more products in a website regarding electronic commerce from an external device operating the website:
      transmitting of delivery destination information to a terminal at which the user browses the website; and
      causing the delivery destination information to be displayed on a predetermined web page, of the website operated by the external device and browsed by the user on the terminal, on the terminal before settling the order without the delivery destination information passing through the external device,
   wherein the delivery destination information relates to a vehicle, a building, or a facility for the user to designate an inside of the vehicle, the building, or the facility that is used by a user as the delivery destination of the one or more products.

* * * * *